US008364910B2

(12) United States Patent
Wilkerson et al.

(10) Patent No.: US 8,364,910 B2
(45) Date of Patent: Jan. 29, 2013

(54) HARD OBJECT: HARDWARE PROTECTION FOR SOFTWARE OBJECTS

(76) Inventors: Daniel Shawcross Wilkerson, Berkeley, CA (US); John David Kubiatowicz, Pleasant Hill, CA (US)

(*) Notice: Subject to any disclaimer, the term of this patent is extended or adjusted under 35 U.S.C. 154(b) by 1053 days.

(21) Appl. No.: 12/045,542

(22) Filed: Mar. 10, 2008

(65) Prior Publication Data
US 2008/0222397 A1 Sep. 11, 2008

Related U.S. Application Data

(60) Provisional application No. 60/905,988, filed on Mar. 8, 2007.

(51) Int. Cl.
*G06F 12/00* (2006.01)
(52) U.S. Cl. ........... 711/152; 711/163; 711/208; 726/30
(58) Field of Classification Search ............... 711/152, 711/163, 208; 726/30
See application file for complete search history.

(56) References Cited

U.S. PATENT DOCUMENTS

| | | | |
|---|---|---|---|
| 4,408,274 A | 10/1983 | Wheatley | |
| 4,434,464 A | 2/1984 | Suzuki | |
| 4,442,484 A | 4/1984 | Childs | |
| 4,525,780 A | 6/1985 | Bratt | |
| 4,701,846 A | 10/1987 | Ikeda | |
| 5,075,842 A | 12/1991 | Lai | |
| 5,075,845 A | 12/1991 | Lai | |
| 5,075,848 A | 12/1991 | Lai | |
| 5,157,777 A | 10/1992 | Lai | |
| 5,627,987 A | 5/1997 | Nozue | |
| 5,845,129 A | 12/1998 | Wendorf | |
| 5,890,189 A | 3/1999 | Nozue | |
| 5,892,944 A | 4/1999 | Fukumoto | |
| 6,542,919 B1 | 4/2003 | Wendorf | |
| 6,854,039 B1* | 2/2005 | Strongin et al. | ............... 711/163 |
| 6,941,473 B2 | 9/2005 | Etoh | |
| 7,134,050 B2 | 11/2006 | Wenzel | |
| 7,287,140 B1 | 10/2007 | Asanovic | |
| 7,882,318 B2* | 2/2011 | Savagaonkar et al. | ......... 711/163 |

OTHER PUBLICATIONS

[BO-2003]: Randal E. Bryant and David R. O'Hallaron "Computer Systems: A Programmer's Perspective" Prentice Hall 2003.
[EKO-1995]: Dawson R. Engler, M. Frans Kaashoek, James O'Toole "Exokernel: An Operating System Architecture for Application-Level Resource Management", Symposium on Operating Systems Principles, 1995, pp. 251-266.
[G-2005]: S. Gorman, "Overview of the Protected Mode Operation of the Intel Architecture" (date unknown to me).
[HP-1998]: "HP OpenVMS Systems Documentation: OpenVMS Alpha Guide to 64-Bit Addressing and VLM Features", Jan. 1998.
[I-2005] "Intel 80386 Programmer's Reference Manual", 1986.
[MUNGI]: "The Mungi Manifesto", http://www.ertos.nicta.com.au/research/mungi/manifesto.pml (date unknown to me).

(Continued)

*Primary Examiner* — Kalpit Parikh

(57) ABSTRACT

In accordance with one embodiment, additions to the standard computer microprocessor architecture hardware are disclosed comprising novel page table entry fields 015 062, special registers 021 022, instructions for modifying these fields 120 122 and registers 124 126, and hardware-implemented 038 runtime checks and operations involving these fields and registers. More specifically, in the above embodiment of a Hard Object system, there is additional meta-data 061 in each page table entry beyond what it commonly holds, and each time a data load or store is issued from the CPU, and the virtual address 032 translated to the physical address 034, the Hard Object system uses its additional PTE meta-data 061 to perform memory access checks additional to those done in current systems. Together with changes to software, these access checks can be arranged carefully to provide more fine-grain access control for data than do current systems.

18 Claims, 15 Drawing Sheets

OTHER PUBLICATIONS

[OSSNMS-1992]: T. Okamoto, H. Segawa, S. H. Shin, H. Nozue, Ken-Ichi Maeda, M. Saito, "A Micro-Kernel Architecture for Next Generation Processors", Proceedings of the Workshop on Microkernels and Other Kernel Architectures, 1992, pp. 83-94.

[W-2004]: Emmett Witchel, "Mondrian Memory Protection", Ph.D. Thesis MIT, 2004.

[WA-2003]: Emmett Witchel, Krste Asanovic, "Hardware Works, Software Doesn't: Enforcing Modularity with Mondriaan Memory Protection" 9th Workshop on Hot Topics in Operating Systems (HotOS-IX), Lihue, HI, May 2003.

[WCA-2002]: Emmett Witchel, Josh Cates, Krste Asanovic, "Mondrian Memory Protection", ASPLOS-X: Proceedings of the 10th international conference on Architectural support for programming languages and operating systems, San Jose, California 2002, pp. 304-316.

[WS-1992]: John Wilkes, Bart Sears, "A comparison of Protection Lookaside Buffers and the PA-RISC protection architecture", HP Laboratories Technical Report HPL-92-55, Mar. 1992, pp. 1-11.

[ZLFQZMT-2004]: P. Zhou, W. Liu, L. Fei, S. Lu, F. Qin, Y. Zhou, S. Midkiff, J. Torrellas, "AccMon: Automatically Detecting Memory-related Bugs via Program Counter-based Invariants", IEEE MICRO, 2004.

[ZQLZT-2004]: P. Zhou, F. Qin, W. Liu, Y. Zhou, J. Torrellas, "iWatcher: Efficient Architectural Support for Software Debugging", International Symposium on Computer Architecture ISCA, 2004.

[ZQLZT-2004b]: P. Zhou, F. Qin, W. Liu, Y. Zhou, J. Torrellas, "iWatcher: Simple and General Architectural Support for Software Debugging", IEEE Top Picks in Computer Architecture, 2004.

Martin Abadi, Mihai Budiu, Ulfar Erlingsson, Jay Ligatti, "Control-Flow Integrity: Principles, Implementations, and Applications", ACM Conference on Computer and Communications Security, Nov. 2005.

Jeffrey S. Chase, Henry M. Levy, Michael J. Feeley, Edward D. Lazowska, "Sharing and Protection in a Single-Address-Space Operating System", ACM Transactions on Computer Systems 1994, vol. 12, No. 4, pp. 271-307.

E.J. Koldinger, J.S. Chase, S.J. Eggers, "Architectural Support for Single Address Space Operating Systems", 1992, Architectural Support for Programming Languages and Operating Systems (ASPLOS) V, pp. 175-186.

Robert Wahbe, Steven Lucco, Thomas E. Anderson, Susan L. Graham "Efficient Software-Based Fault Isolation", ACM SIGOPS Operating Systems Review, Dec. 1993, vol. 27, No. 5, pp. 203-216.

A. Wiggins, S. Winwood, H. Tuch, G. Heiser, "Legba: Fast Hardware Support for Fine-Grained Protection", 8th Asia-Pacific Computer Systems Architecture Conference (ACSAC), Apr. 2003.

Thread in usenet newsgroup comp.arch "Does PowerPC 970 has Tagged TLBs", May 2003.

Thread in usenet newsgroup comp.sys.hp.hpux "SEVERE performance problems with shared libraries at HP-UX 9.05", Nov. 1995.

Intel, "Intel Itanium Architecture Software Developer's Manual, vol. 2: System Architecture", Revision 2.3, May 2010, pp. 2:59-2:60, pp. 2:564-2:565.

Intel, "Intel Itanium Architecture Software Developer's Manual, vol. 3: Intel Itanium Instruction Set Reference", Revision 2.3, May 2010, p. 3:29, p. 3:53.

Nicholas P. Carter, Stephen W. Keckler, William J. Dally. "Hardware Support for Fast Capability-based Addressing", ASPLOS-VI Proceedings—Sixth International Conference on Architectural Support for Programming Languages and Operating Systems, San Jose, California, Oct. 4-7, 1994. ACM SIGPLAN Notices 29(11) pp. 319-327.

Joe Devietti, Colin Blundell, Milo M. K. Martin, Steve Zdancewic. "HardBound: Architectural Support for Spatial Safety of the C Programming Language", ASPLOS-XIII Proceedings—Thirteenth International Conference on Architectural Support for Programming Languages and Operating Systems, Seattle, Washington, Mar. 1-5, 2008. ACM SIGARCH Computer Architecture News 36(1) pp. 103-114.

Marti'n Abadi, Mihai Budiu, U'lfar Erlingsson, Jay Ligatti. "Control-Flow Integrity Principles, Implementations, and Applications", Proceedings of the 12th ACM Conference on Computer and Communications Security, Alexandria, Virginia, Nov. 7-11, 2005, pp. 340-353.

* cited by examiner

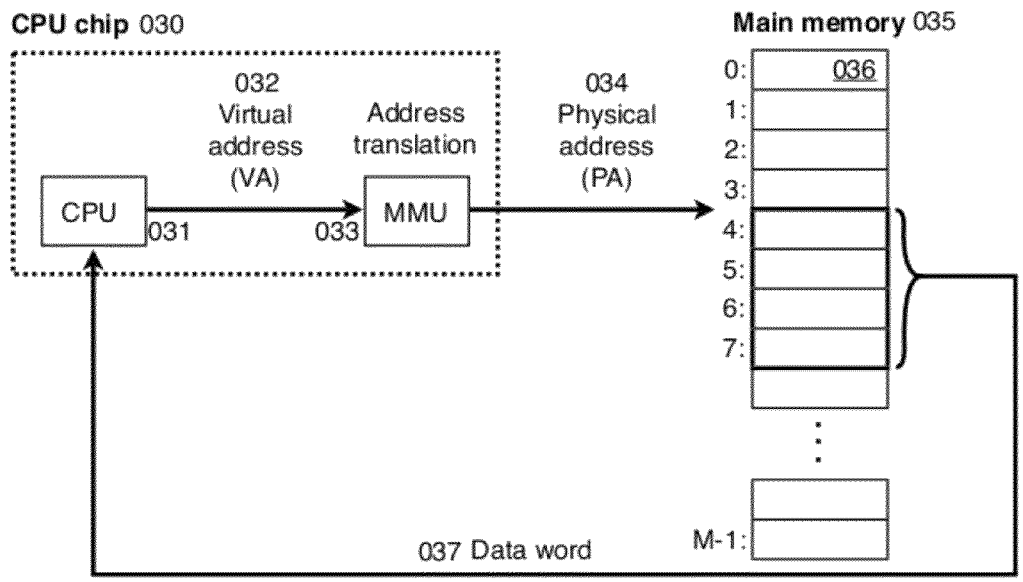
Figure 3a -- Prior Art
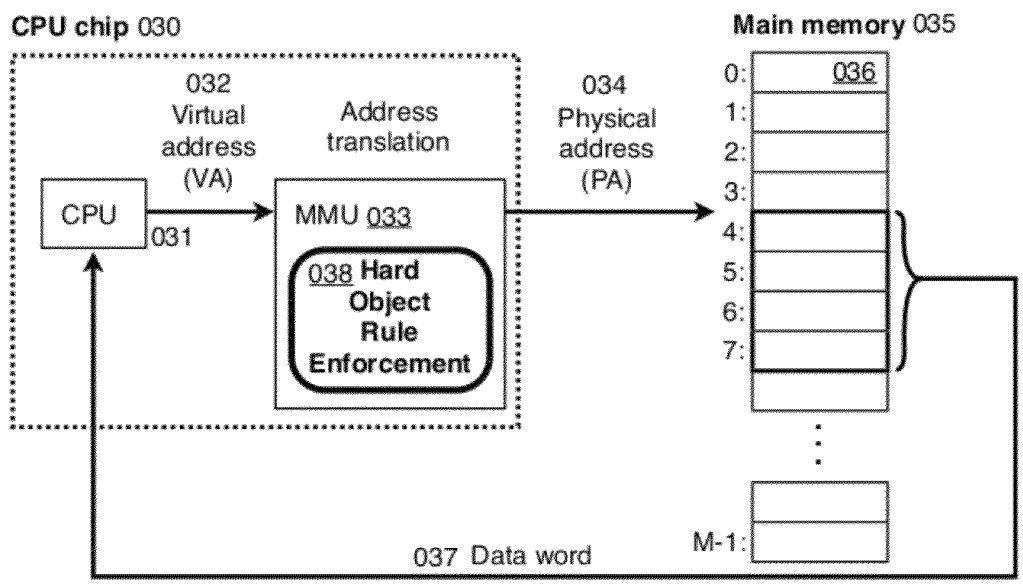
Figure 3b

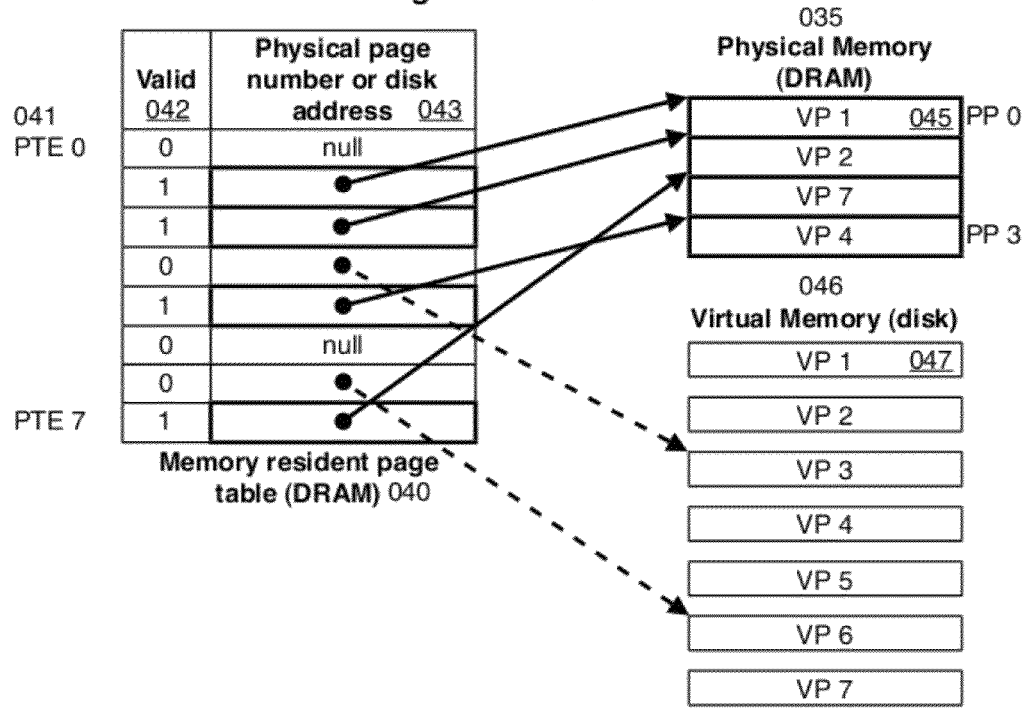
Figure 4 -- Prior Art
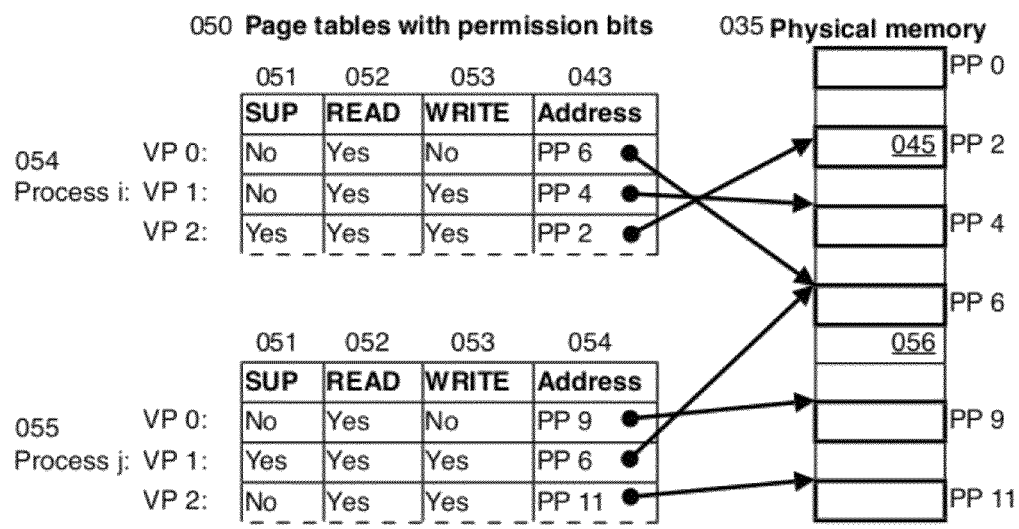
Figure 5 -- Prior Art

Figure 6a

060 Page table

| | SUP (1 bit) 051 | READ (1 bit) 052 | WRITE (1 bit) 053 | integrity (1 bit) 062 | owner. start (32 bits) 063 | owner. length (32 bits) 064 | Address (32 bits) 043 |
|---|---|---|---|---|---|---|---|
| | | | | 061 Hard Object meta-data | | | |
| VP 0: | No | Yes | No | Yes | null | 0 | PP 6 |
| VP 1: | No | Yes | Yes | Yes | VP 0+27 | 71 | PP 4 |
| VP 2: | Yes | Yes | Yes | No | VP 0+98 | 413 | PP 2 |

Figure 6b

Page table 065

| | Module-ID (X bits) 066 | Address (32 bits) 043 |
|---|---|---|
| VP 0: | 2 | PP 6 |
| VP 1: | 7 | PP 4 |
| VP 2: | 22 | PP 2 |

067 Module meta-data table

| | SUP (1 bit) 051 | READ (1 bit) 052 | WRITE (1 bit) 053 | integrity (1 bit) 062 | owner. start (32 bits) 063 | owner. length (32 bits) 064 |
|---|---|---|---|---|---|---|
| | | | | 061 Hard Object meta-data | | |
| 0: | No | Yes | No | Yes | null | 0 |
| 1: | No | Yes | Yes | Yes | VP 0+27 | 71 |
| 2: | Yes | Yes | Yes | No | VP 0+98 | 413 |

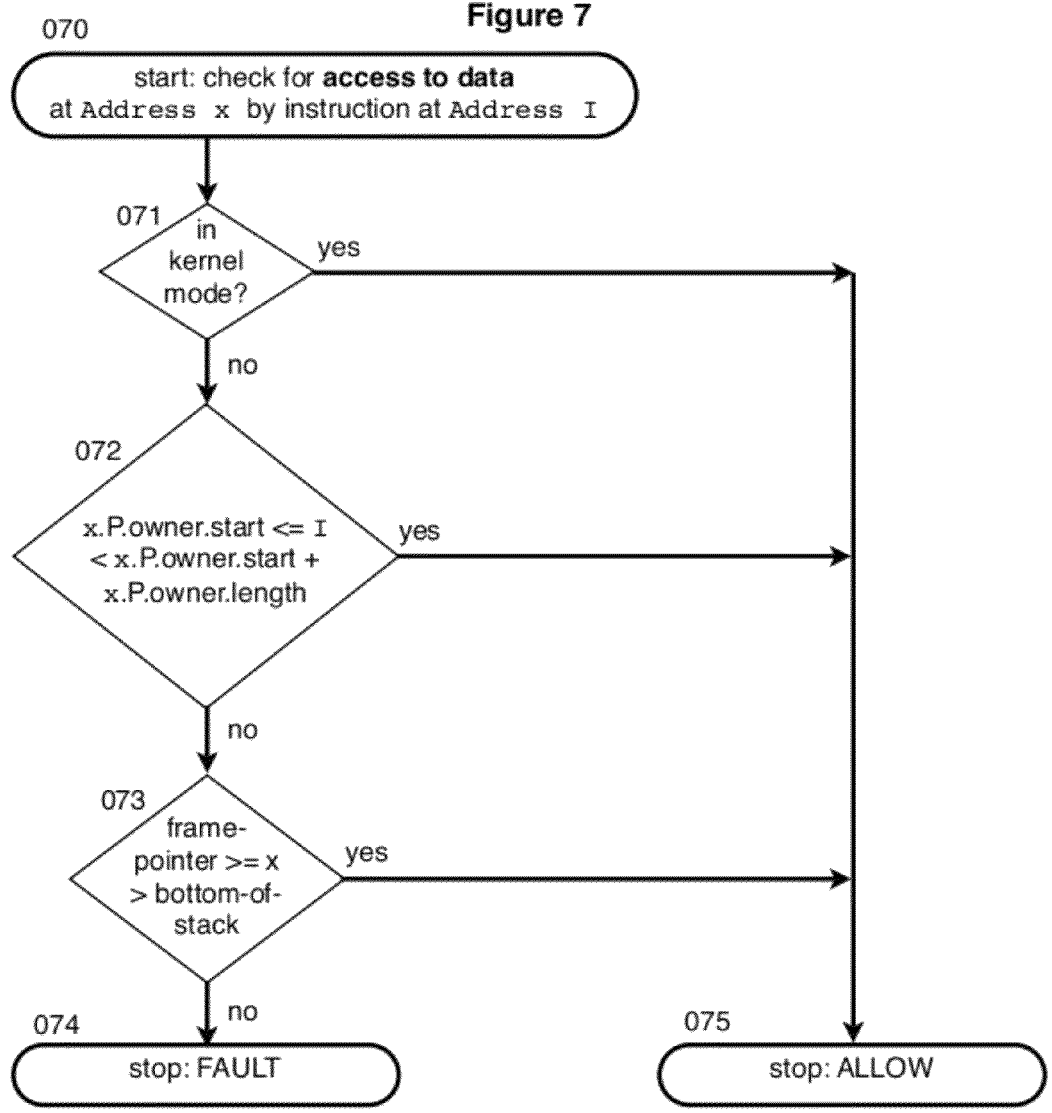

Figure 10a

| type | meta-data field name | description |
|---|---|---|
| *Bit* | `integrity` 062 | data integrity verified |
| *Range* | `owner` 015 (in two parts below): | code range of owner text |
| *(sub-parts of Range)* *Address* | `start` 063 | start of the range |
| *UInt* | `length` 064 | length of the range |

Figure 10b

| type | meta-data field name | description |
|---|---|---|
| *Bit* | `public-readable` 100 | data is public readable |

Figure 11a

| type | register name | description |
|---|---|---|
| *Address* | `frame-pointer` 021 | top of frame |
| *Address* | `bottom-of-stack` 022 | max allowed extent of stack |

Figure 11b

| type | register name | description |
|---|---|---|
| *Address* | `untrusted-start` 111 | together delimit the extent of the untrusted region |
| *Address* | `untrusted-end` 112 | |

Figure 11c

| type | register name | description |
|---|---|---|
| *Address* | `privilege-master-start` 113 | together delimit the extent of the privilege-master region (PMR) |
| *Address* | `privilege-master-end` 114 | |

Figure 12a

| | |
|---|---|
| set-owner(Address x, Address newStart, UInt newLength) | 120 |
| Address*UInt get-owner(Address x) | 121 |
| set-integrity(Address x, Bit newIntegrity) | 122 |
| Bit get-integrity(Address x) | 123 |
| set-frame-pointer(Address newFramePointer) | 124 |
| Address get-frame-pointer() | 125 |
| set-bottom-of-stack(Address newBottomOfStack) | 126 |
| Address get-bottom-of-stack() | 127 |

Figure 12b

| | |
|---|---|
| branch-on-integrity-false(Address x, Address jumpTo) | 128 |
| branch-on-integrity-true(Address x, Address jumpTo) | 129 |

Figure 12c

| | |
|---|---|
| set-public-readable(Address x, Bit newPublicReadable) | 12A |
| Bit get-public-readable(Address x) | 12B |

Figure 12d

| | |
|---|---|
| set-permission-value(DomainID d, Address x, PermissionValue p) | 12C |
| PermissionValue get-permission-value(DomainID d, Address x) | 12D |

Figure 12e

| | |
|---|---|
| DomainID make-sub-domain(Address start, Address length) | 12E |
| del-sub-domain(DomainID d) | 12F |
| attach-sub-domain(DomainID d, DomainID subDom) | 12G |
| detach-sub-domain(DomainID d, DomainID subDom) | 12H |

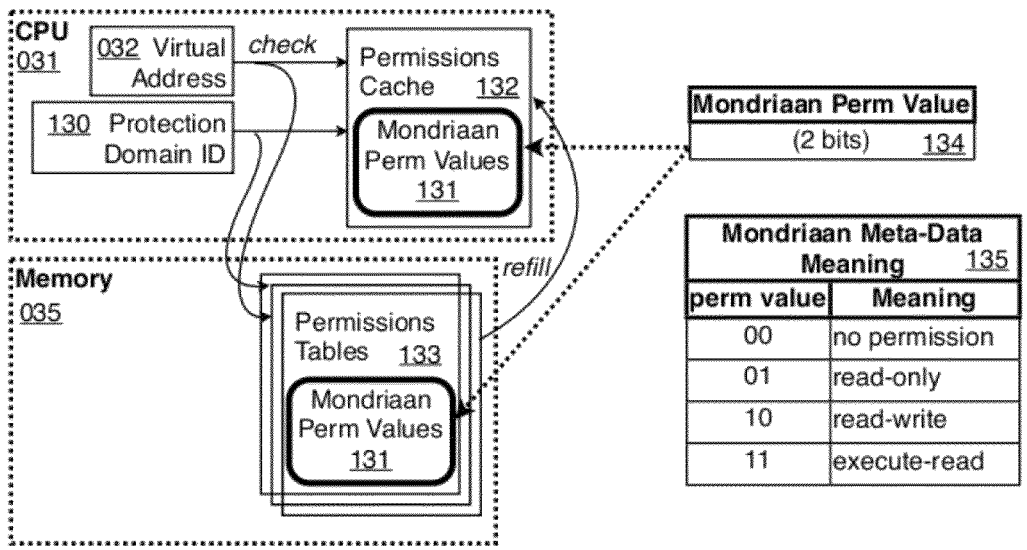
Figure 13a -- Prior Art
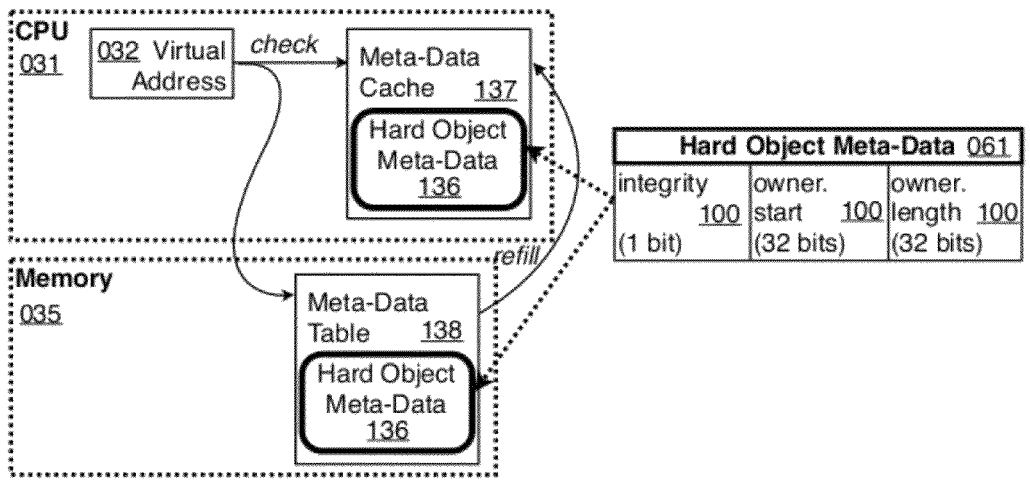
Figure 13b

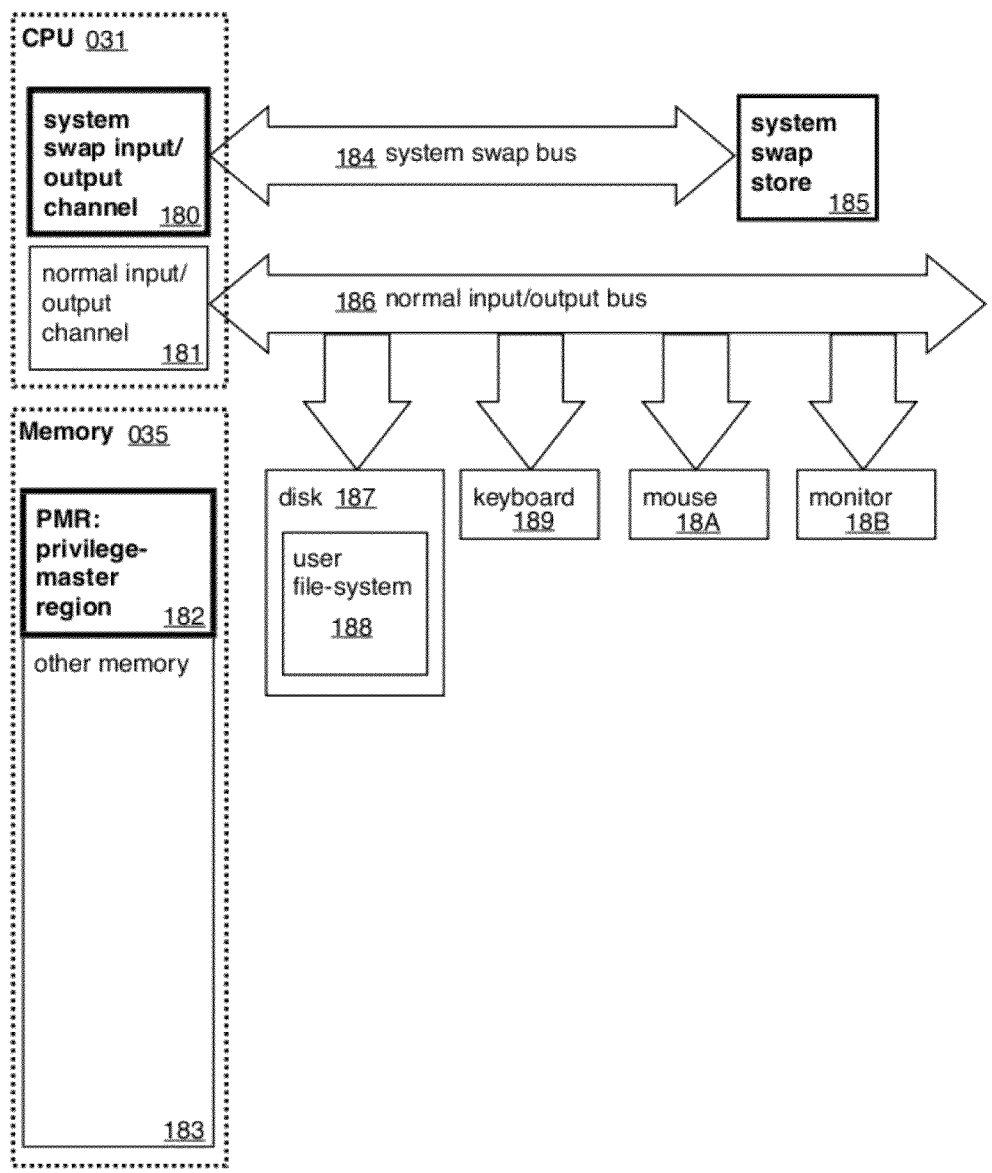

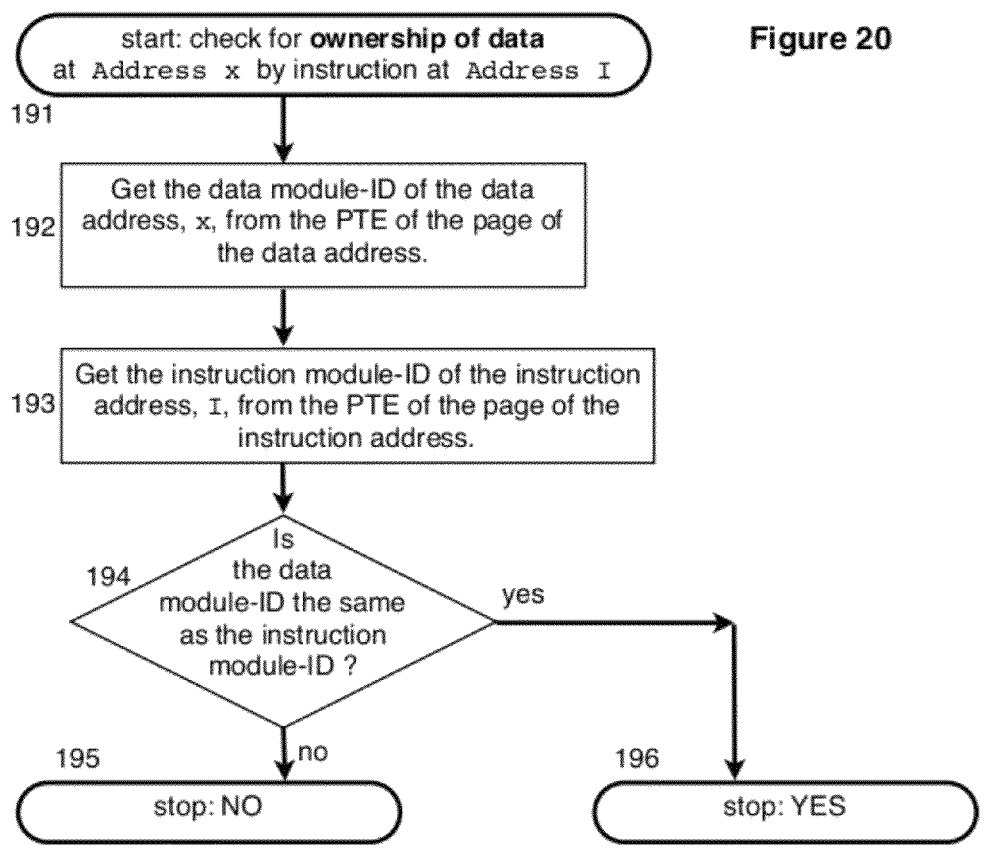

HARD OBJECT: HARDWARE PROTECTION FOR SOFTWARE OBJECTS

CROSS-REFERENCE TO RELATED APPLICATIONS

This application claims the benefit under 35 USC §119(e) of U.S. Provisional Application No. 60/905,988 filed 8 Mar. 2007, "HARD OBJECT: HARDWARE PROTECTION FOR SOFTWARE OBJECTS". The aforementioned application is hereby incorporated herein by reference.

FIELD

This work relates to improvements in microprocessor architecture for supporting (1) software correctness, specifically supporting module isolation and preventing cross-module correctness failures, and (2) computer security, specifically protecting parts of programs from each other within a single process.

BACKGROUND

Concise references to prior art are tabulated and set forth in the "References" section below. For ease of readability, the system disclosed herein is hereinafter referred to as "Hard Object".

Engineers who build machines made of atoms (rather than of software) rely on locality of causality to make machines mostly safe in the presence of failure or attacks: cars have a firewall between the engine and the driver; houses have walls and a lockable door between the inside and the outside. However, computer hardware engineers have worked very hard to eliminate all locality of causality within a computer: that is, on a modern computer, within any given process, any instruction can access any data in the entire address space of the process. Hardware engineers did this because giving the software engineers freedom to use any instruction to access any data makes it very easy to write programs that do what you really want; however having this much freedom also makes it very easy to write programs that do what you really do not want. Although software engineers separate programs into modules (code that exclusively maintains the invariants of its data), they lack appropriate fine-grain hardware primitives with which to efficiently implement enforcement of this separation. This state of affairs contributes to the problem that "machines made of software" (programs) tend to be much less reliable than machines made of atoms.

Software Correctness Generally

The punishing exactitude and overwhelming complexity of computer programs make the task of writing correct software almost impossible. Further, the stakes are high: we need only cite the title of a 2002 NIST study: "Software Errors Cost U.S. Economy $59.5 Billion Annually: NIST Assesses Technical Needs of Industry to Improve Software-Testing." Due to software bugs (a) organized crime controls millions of computers, (b) large infrastructural projects are delayed or fail, and (c) people even die. The problem is that one can never do enough testing to ensure program correctness—something else is badly wanted.

Programmers follow certain disciplines designed to reduce mistakes, a common one being "modularity"—a software embodiment of locality of causality mentioned above: programs are separated into parts called "modules" where each module has its own data together with code to manage it. Further, to ensure correctness, the module's code is written in such a way as to maintain certain "data invariants": properties of the module data which are always true. Some modules manage multiple instances of their data's state, each instance sometimes called an "object" and the module the "class" of the object. While this modularity discipline works well, current computer hardware systems do not protect a module within a program from any possibly errant or malicious behavior of other modules that may violate the module's boundaries; see FIGS. 1 and 2 for examples of one module 017 attacking the data of another 012. Therefore all modules are vulnerable to the threat of a single mistake, or a deliberate attack, from any one module: the correctness of the whole program is extremely brittle.

Modern Computers Generally

Modern microprocessors are organized in a fairly standard way. A very readable and thorough reference on this topic is Randal E. Bryant and David R. O'Hallaron "Computer Systems: A Programmer's Perspective" Prentice Hall 2003. At a high level of abstraction, a single-core microprocessor consists of a central processing unit 031, a random access memory 035, and peripherals 187 189 18A 18B.

The "central processing unit" (CPU) performs one of a fixed set of actions one after another according to the instructions of a program, much as a very reliable, tireless, obedient, and utterly unimaginative person might theoretically follow a detailed set of instructions. The CPU has a small amount of scratch space called "registers"; typically there are on the order of 100 or fewer registers to a CPU.

The "random access memory" (RAM) is a passive device which maps (1) an "address" to (2) a "datum" stored in a cell at that address, much as cubbyholes on a wall map each cubbyhole's number to the cubbyhole's contents. The CPU may either (1) write information to or (2) read information from a memory cell at a given address. While RAM size is also fixed, it is typically on the order of a billion (1 Gigabyte) cells.

The computer's CPU/RAM core is also connected to "peripherals": external devices enabling interaction with the outside world, such as disk drives, displays, keyboards, mice, etc. To allow a program to interact with these devices, the hardware has either (1) special instructions for sending data to or receiving data from them, or (2) "memory-mapped I/O": special RAM cells repurposed by the hardware such that writing or reading from these cells interacts with the device (rather than storing the data, as RAM cells would usually do).

A computer is typically designed to move several bits around together in a block, often called a "word". A computer is characterized by the number of bits in its word, its "word size", much as an engine is characterized by the total volume of its cylinders. Typical modern computers have 32-bit or 64-bit words. For specificity we speak of a 32-bit machine but nothing prevents the same ideas from application to machines of other word sizes.

Software

Information stored in RAM cells can be interpreted as either "data" or as "program", as follows. There is one special CPU register called the "program counter" (PC) which contains an index into RAM where the next instruction to be followed by the CPU is held. The operation of the computer typically works as follows to "execute" a program:

(1) load the contents of the RAM cell pointed to by the PC, (2) follow that instruction, (3) increment the PC (unless the instruction set it to a new value), (4) repeat.

Instructions are typically of one of the following kinds: (a) a data "access", which is either a "read" (or "load") of data from RAM into a CPU register, or a "write" (or "store") of data from a CPU register into RAM, (b) a logical, fixed-point-arithmetic, or floating-point-arithmetic operation on two registers, or (c) a "branch" which sets the PC to a new value, sometimes only if a certain register has a certain value.

Writing and maintaining programs at the low abstraction level of these very small steps tends to be tedious, error prone, and mind-numbing. Therefore, programs are typically written in higher-level "programming languages" providing more useful constructs with which to construct programs. One of the most useful constructs is the "function": a re-usable sub-program; a function has an "interface" specifying the format and meaning of data "argument(s)" passed as input and "return value(s)" obtained as output. Programs written in these higher-level languages are translated into executable machine instructions by a special program called a "compiler".

Multi-Processing and the Kernel

A "multi-processing" computer can run more than one program at once, where each instance of a running program is called a "process". Special software called the "kernel" runs in a special CPU mode called "kernel mode" which gives it extra powers over normal "user mode". The kernel uses these powers to manage processes, such as putting them to "sleep" when a resource is requested and "waking" them up again when that resource is available.

Much like a city government, the kernel (mayor) coordinates with further special "software libraries" and "utility programs" (public servants) to: (a) provide commonly-needed but often messy utility services for the processes (citizens), such as interfacing to a particular kind of disk drive, and (b) protect the processes from each other (more on this below). Taken together the kernel and these utility libraries and programs are called the "operating system" (OS) (the city government in our metaphor). Users ask for services using a special hardware instruction called a "system call" or "kernel crossing".

Whereas the kernel, just like a government, is the only agent with the power to take certain special actions, the kernel can take actions at the request of user processes if it determines that the user is allowed to take the action. That is, the hardware will allow certain operations only when in kernel mode, however these operations may be "wrapped" with a system call to allow the user to request the kernel to do the operation.

Further it is important to note that, just as in real life, asking the government to do something for you is slow; that is, for a user program to do a system call/kernel crossing is much slower than for a user function to simply call another user function. Therefore reducing the number of kernel calls in a program is an important efficiency concern.

Memory Management Generally

A program that needs only a fixed amount of memory during its run can allocate all of that state in one place at the start; such state is called "global" state (it is globally associated with the whole program) and is the first of three separate parts into which a process's memory is organized.

A particular function of a program needs its own local memory, called its "frame". A "caller" function, $f$, may invoke a "callee" function, g, to solve a sub-problem; during the execution of g, the execution of $f$ is suspended. The frame of memory for the execution of g is allocated immediately below (typically) that of $f$, and when g is done, the memory that was g's frame may be re-used by a later call. That is, the frames "push" on and "pop" off, like a stack of plates, and so this second part of memory is called the "stack" 200. Note that since each function call has its own frame, a function $f$ may even call itself and the operation of the two instances of $f$ do not mutually interfere.

Sometimes a program requires "long term" data structures that also do not fit into the fixed-sized global state. The heap is managed by a system "memory allocator" library to which a program make make a request to have a specific amount of contiguous addresses or "space" reserved or "allocated" for a particular use. The library finds some available unused space and returns its initial address called a "pointer to" the space. Once in use for a specific purpose the space is typically called an "object". When an object is no longer needed it can be "deleted" or "freed" for re-use by making a different call to the same memory allocator library. This third part of memory where such objects are allocated and freed has no simple organizational structure and is called the "heap" 010.

Virtual Memory

A problem arises in that there is sometimes not enough physical memory to store all of the data of all of the running processes. The usual solution is a scheme called "virtual memory". Quoting [BO-2003, section 10.1 "Physical and Virtual Addressing"] (Note that any and all editing is in square brackets; emphasis of non-square-bracket text is in the original):

[M]odern processors designed for general-purpose computing use a form of addressing known as virtual addressing. (See figure [3a] [which is a copy of [BO-2003, FIG. 10.2]]. With virtual addressing, the CPU accesses main memory by generating a virtual address (VA), which is converted to the appropriate physical address before being sent to the memory. The task of converting a virtual address to a physical one is known as address translation . . . . Dedicated hardware on the CPU chip called the memory management unit (MMU) translates virtual addresses on the fly, using a look-up table stored in main memory whose contents are managed by the operating system.

The Memory Hierarchy

Thus the MMU 033, in cooperation with the operating system, stores some of the data from virtual RAM on physical RAM 035 and the rest on an external disk drive 046. Any process requesting access to data that is actually on disk is paused, the data is brought in (often requiring other data to be sent out), and then the process re-started. To support this feature, memory is grouped into "pages" that are moved in and out as a whole. Pages may be of different sizes, but in current practice 4-kilobytes is typical and for specificity we speak of this as the page size, though other sizes will work. The external device that stores the pages that are not in RAM is called the "swap" device 185.

We can see at this point that there are many kinds of memory, some with fast access and small capacity, some with slow access and large capacity, and combinations in between. These kinds of memory are arranged in "layers", the fast/small layers used when possible and the slow/large layers used when necessary, as follows. (1) Most CPU instructions use CPU registers, access to which is very fast. (2) When the registers are full, the program resorts to using RAM, which is slower, but much larger. RAM actually has at least two layers: (2.1) small amounts of fast memory where frequently-used RAM address/data pairs are stored called the "cache", and (2.2) normal RAM. Moving data between the cache and RAM is handled by the hardware. (3) As described above, when RAM is full, the operating system resorts to using a swap disk, which has huge capacity but is far slower still. This whole system is called the "memory hierarchy".

Page Tables and Page Meta-Data

The MMU and/or OS clearly must track which virtual pages map to which physical pages or disk blocks. That is, for each page of data, further "meta-data" (data about data) is kept. Quoting [BO-2003, section 10.3.2 "Page Tables"]:

> FIG. [4] [which is a copy of [BO-2003, FIG. 10.4]] shows the basic organization of a page table. A page table is an array of page table entries (PTEs). Each page in the virtual address space has a PTE at a fixed offset in the page table. For our purposes, we will assume that each PTE consists of a valid bit and an n-bit address field. The valid bit indicates whether the virtual page is currently cached in DRAM. If the valid bit is set, the address field indicates the start of the corresponding physical page in DRAM where the virtual page is cached. If the valid bit is not set, then a null address indicates that the virtual page has not yet been allocated. Otherwise, the address points to the start of the virtual page on disk.
>
> The example in FIG. [4] shows a page table for a system with 8 virtual pages and 4 physical pages. Two virtual pages (VP 1, VP2, VP4, and VP7) are currently cached in DRAM. Two pages (VP 0 and VP 5) have not yet been allocated, and the rest (VP 3 and VP 6) have been allocated but are not currently cached.

Process Address Spaces

Another problem arises in that if all of these application processes use the same RAM it is difficult for them to cooperate in such a way as to not write on each other's data. The virtual-memory solution is for the operating system and hardware to present an illusion (or abstraction) that each process is the only process running on the computer and has all of RAM to itself; this abstracted RAM is the process's "(virtual) address space". Quoting [BO-2003, section 10.4 "VM as a Tool for Memory Management"]:

> To this point, we have assumed a single page table that maps a single virtual address space to the physical address space. In fact, operating systems provide a separate page table, and thus a separate virtual address space, for each process.
>
> Note however that sometimes multiple "lightweight processes" or "threads" are run in the same address space even on a machine that also runs processes in separate address spaces. One common design is that the kernel/operating system also manages these threads and another design is that user-mode (not kernel) "thread manager" software within a process manages them.

Memory Protection

Virtual memory thus prevents processes from accidentally or deliberately overwriting each other's data or that of the operating system itself. This protection aspect of virtual memory has become quite important. Quoting [BO-2003, section 10.5 "VM as a Tool for Memory Protection"]:

> Any modern computer system must provide the means for the operating system to control access to the memory system. A user process should not be allowed to modify its read-only text section [that is, its executable program code]. Nor should it be allowed to read or modify any of the code and data structures in the kernel. It should not be allowed to read or write the private memory of other processes, and it should not be allowed to modify any virtual pages that are shared with other processes, unless all parties explicitly allow it (via calls to explicit interprocess communication system calls).
>
> As we have seen, providing separate virtual address spaces makes it easy to isolate the private memories of different processes. But the address translation mechanism can be extended in a natural way to provide even finer access control. Since the address translation hardware reads a PTE each time the CPU generates an address, it is straightforward to control access to the contents of a virtual page by adding some additional permission bits to the PTE. FIG. [5] [which is a copy of [BO-2003, FIG. 10.11]] shows the general idea.
>
> In this example, we have added three permission bits to each PTE. The SUP bit indicates whether processes must be running in kernel (supervisor) mode to access the page. Processes running in kernel mode can access pages for which SUP is 0. The READ and WRITE bits control read and write access to the page. For example, if process i is running in user mode, then it has permission to read VP 0 and to read or write VP 1. However, it is not allowed to access VP 2.
>
> If an instruction violates these permissions, then the CPU triggers a general protection fault that transfers control to an exception handler in the kernel. Unix shells typically report this exception as a "segmentation fault".

As you can see, prior art systems usually partition pages into (a) "text" (or executable program code) and (b) "data". After the program has been loaded into memory, text pages are marked to be executable and read-only by setting the permissions bits in the page table; similarly data pages are usually marked to be non-executable and read-write, though read-only data is possible.

PRIOR ART

While reviewing the prior art pertinent to the present Hard Object work, for convenience both similarities and contrasts between the prior art and the Hard Object system are discussed together.

Intel x86 Segmented Addressing

As mentioned above, many architectures support a means of managing permissions on text and data as organized into pages. The Intel x86 architecture is one such. Quoting [I-2005]:

> The concept of privilege for pages is implemented by assigning each page to one of two levels: Supervisor level (U/S=0)—for the operating system and other systems software and related data. User level (U/S=1)—for applications procedures and data . . . . When the processor is executing at supervisor level, all pages are addressable, but, when the processor is executing at user level, only pages that belong to the user level are addressable.

Virtual memory protection allows operating system and user programs to interact without danger to the operating system. However two different user modules within the same program, and therefore the same virtual address space, are not protected from one another. In contrast the Hard Object system disclosed herein can isolate two modules even if they are in the same address space.

The Intel x86 architecture, [G-2005], also supports a means of managing permissions on text addresses and data addresses as organized into "segments" which manage the association of permissions and privilege levels to both text and data addresses. Quoting [I-2005]:

> The concept of privilege is implemented by assigning a value from zero to three to key objects recognized by the processor. This value is called the privilege level. The value zero represents the greatest privilege, the value three represents the least privilege . . . . [T]hese levels of privilege can be interpreted as rings of protection. The center is for the segments containing the most critical software, usually the kernel of the operating system. Outer rings are for the segments of less critical software . . . . The processor automatically evaluates access to a data segment by comparing privilege levels . . . , [A] procedure can only access data that is at the same or less privileged level.

Note that in this prior art Intel system, there are only four such privilege levels. Further, this restriction to a small number, such as four, is pervasive throughout the design—for example, each privilege level has its own stack—and so generalizing the design by increasing the number of privilege levels seems infeasible. Therefore it seems that this small number of privilege levels may constitute the maximum number of "protection domains" into which the set of modules may be partitioned (however also see a different way of using segments hypothesized below). In contrast a Hard Object system can easily have an arbitrary number of domains, though software support must also be provided to achieve the goal of enforceable software module isolation.

The levels of these prior art Intel domains are ordered and therefore apparently they cannot be made mutually exclusive, thus members of a domain with stronger privilege will always have access to the data of a domain with weaker privilege; in contrast the Hard Object system disclosed herein can partition domains in a mutually-exclusive way.

In most systems in the event of a function call, arguments are passed from caller to callee on the stack, but in the Intel system when functions call across privilege levels the function arguments must be copied from the stack of one privilege level to the stack of the other. In contrast, due to the Hard Object stack protection mechanism, a call across a protection domain in a Hard Object system requires no such copying.

In the above-cited Intel system, instructions that manage the segment permissions can only be executed in kernel mode; in contrast Hard Object allows any module to transfer "ownership" of memory addresses to another module without a kernel call in order to run a privileged instruction—where "ownership" is a concept introduced below to indicate the right of code to access memory addresses and also the right to transfer this right to other code.

In the above Intel system, segments of memory can be marked with permissions (or the absence of permission) such as "read-only" or "executable"; however there are major design differences between Intel segments and Hard Object owner ranges. An Intel segment is associated with the current CPU state and refers to a range of addresses that may be accessed. Therefore when a protection boundary is crossed, instructions must execute to change the segment registers that are the embodiment of this CPU state. In contrast a Hard Object owner range is associated with the address itself and refers to a range of text that may access this address. This owner range is checked whenever an instruction accesses an address and therefore when a protection boundary is crossed by the program counter no other CPU state need change.

Mondriaan Memory Protection

Of particular interest, Mondriaan Memory Protection, [WCA-2002; WA-2003; W-2004], attaches meta-data to addresses at the word-granularity using a special hardware "permissions tables" 133; see FIG. 13*a*.

Protection Domains

In the Mondriaan design there is a concept of "protection domains". Each domain has its own "permissions table" which attaches "permission value" 131 meta-data to memory addresses. At any particular time, a single protection domain is active, as indicated by the current value of the Protection Domain ID register 130. Note that the active permissions table must be swapped out on cross-domain calls. This is a heavyweight activity compared to a traditional function call. The Mondriaan scheme does not provide any specific efficient means to perform this swapping. Quoting [WA-2003]:

We believe CPU designers will be motivated to accelerate cross-domain calls to enable the benefits of protected execution.

In contrast, Hard Object meta-data refers to specific instruction address ranges; the program counter changes naturally at a function call as part of the calling process and thus little extra work is required when the call also crosses a protection domain boundary. Said another way, the Mondriaan Memory Protection mechanism requires considerably more state to be changed (in the form of a change from one table to the other, with the potential flushing of corresponding caching structures) as a result of a protection boundary change than Hard Object does.

Stack Protection Mechanisms

The Mondriaan design discloses a method of stack data protection using a "frame base" register and a "stack limit" register [WA-2003, section 3.3]. The Hard Object design does something very similar with different names ("frame-pointer" 012 and "bottom-of-stack" 022); see FIG. 11*a*. However the Mondriaan mechanism for performing a function call across domains requires the use of a heavyweight mechanism they call "call gates" to pass information from one protection domain to another; data cannot even be simply passed on the stack as is traditional and fast in prior art systems. Quoting [WCA-2002, section 3.8]:

Parameters are passed in registers. More elaborate data structures are passed using a very simplified form of marshalling which consists of the caller traversing the data structure and granting appropriate permission to the provider domain . . . . If two domains call each other frequently, they can copy arguments into buffers which are properly exported.

That implies that these prior art Mondriaan registers have extra mechanism for managing them; in contrast a cross-domain function call in Hard Object system requires no such call-gate mechanism and allows very fast traditional use of the stack to pass data as argument and return it as return values on the stack even when the two functions are in mutually untrusting modules. Then again Hard Object requires additional static analysis of software to make this module separation complete; we have not considered here how much simpler the Mondriaan system—in particular the mechanism for performing a cross-domain function call—could be if reliance upon a similar static analysis were made.

Ownership and Managing Permissions

The Mondriaan design anticipates the Hard Object design rule of allowing only an owner to have the ability to set the owner of the address to another module (be careful reading their articles as they actually they use the word "own" to mean more than one thing; I cite the meaning closest to that of Hard Object). [WCA-2002, section 3.1]: "Every allocated region of memory is owned by a protection domain, and this association is maintained by the supervisor." [WA-2003]: "Only the owner of a memory region may revoke permissions, or grant ownership to another domain." Note however that the Mondriaan design requires these actions taken by an owner be done using a kernel crossing: [WA-2003] "The MMP supervisor software can enforce additional memory usage policies because all calls for permissions manipulation are made via the supervisor." In contrast Hard Object does not require a kernel crossing to change the owner of some addresses, as a user-mode hardware instruction 120 is provided for this purpose.

Nozue et al.

Of particular interest, [OSSNMS-1992] and [U.S. Pat. No. 5,890,189 Nozue, et al.] (which is a continuation of [U.S. Pat. No. 5,627,987 Nozue, et al.]) propose both a "capabilities" system and an "access control lists" (ACLs) system for protecting data pages.

Protection Regions Using Hardware Text Ranges

Their ACLs system annotates memory pages with hardware ranges of text that can read and write them, just as Hard Object does, as well as providing other functionality. While the Nozue design seems to contain hardware features that would provide to software the same functionality as the Hard Object owner range 015 functionality—though not the Hard Object user-mode ownership transfer feature 120 nor the user-mode integrity bit 062—the Nozue design contains more hardware complexity than would be needed by software designed for Hard Object hardware. For example, the Nozue design calls for a PTE to contain three access control entries and a pointer to further entries, allowing the construction of a linked list of entries. In contrast in the Hard Object design simply requires one integrity bit 062, and one owner range 015; any further access control complexity is expected to be performed by software.

Ownership and Managing Permissions

In the Nozue system it seems that setting the ACLs on a page requires a call into the kernel. In current microprocessor architectures and operating systems, kernel calls are expensive (however they do further suggest a change to a Single Address Space Operating System where kernel calls might be cheaper). In contrast the Hard Object method of transferring address ownership uses a single user-mode hardware instruction.

Nozue design does not seem to provide any equivalent of the Hard Object integrity bit 062.

Stack Protection Mechanisms

They also do not seem to provide any method for protecting the stack frame of a function in one module from the code in another module or at least not in a way that would also allow for the traditional contiguous software stack organization (where, for example, function arguments and return values can be passed on the stack); in contrast Hard Object provides a hardware mechanism for protecting the stack frame of a suspended function 024 from an attack by the currently executing function 025; see FIG. 2.

The Region Number Optimization

The Nozue design also contains a region number protection unit to map the instruction address to a region number:

FIG. 38 . . . a region number detection unit 267 detects the region number of the region at which the currently executed program is present, and the ACL entry having the same region number as this region number of the region at which the currently executed program is present is selected from the selected page table entry.

Below we suggest that this mechanism could be combined with the present Hard Object work in an alternative embodiment to reduce the number of bits stored in the page table entries.

Others

[U.S. Pat. No. 4,408,274 Wheatley, et al.] is a hardware capabilities system which associates capabilities to a process; Hard Object works the other way, associating to addresses 012 the code that may operate on it 015. A similar contrast occurs with [U.S. Pat. No. 5,892,944 Fukumoto, et al.] which seems to attach their rights to threads; again, Hard Object attaches rights to addresses. In [U.S. Pat. No. 6,542,919 Wendorf, et al.] and [U.S. Pat. No. 5,845,129 Wendorf, et al.] a method is disclosed where a memory page is associated with a group of threads; again, in contrast a Hard Object system associates rights to addresses, not threads. [U.S. Pat. No. 4,442,484 Childs, Jr., et al.] uses privilege levels per task to protect software objects; in contrast, Hard Object requires no need of privilege levels and does not decide access at the whole-task granularity, but instead at a finer module granularity by distinguishing rights by the instruction address.

[U.S. Pat. No. 6,941,473 Etoh, et al.] provides hardware support for detecting stack smashing; in contrast, Hard Object protects the heap as well as the stack; See FIG. 1. [U.S. Pat. No. 4,701,846 Ikeda, et al.] provides hardware support for separation of the heap and the stack; in contrast, Hard Object goes further and separates the heap in a fine-grain way, as discussed below.

[U.S. Pat. No. 5,075,842 Lai] and [U.S. Pat. No. 5,157,777 Lai, et al.] provide hardware support for marking some data as special meta-data. [U.S. Pat. No. 5,075,845 Lai, et al.] and [U.S. Pat. No. 5,075,848 Lai, et al.] provide pointers to objects stored next to permissions meta-data. In contrast, Hard Object puts all meta-data into the page table 060, leaving the program's virtual address space uncluttered.

[U.S. Pat. No. 4,525,780 Bratt, et al.] provides each software object with a unique 128-bit identifier; in contrast Hard Object requires no special identifiers for software objects and objects are not even a "first class" concept in the hardware, only modules are. [U.S. Pat. No. 4,434,464 Suzuki, et al.] associates program regions with memory regions by assigning keys to realize the relation; in contrast, Hard Object uses no such key system. Similarly, [WS-1992] proposes associating to memory pages an Access Identifier (AID) and to processes Protection Identifiers (PID) where the PIDs of a process associate protections to a page with a matching AID; in contrast Hard Object requires no such PIDs/AIDs.

iWatcher and AccMon, [ZQLZT-2004; ZQLZT-2004b; ZLFLQZMT-2004], check many kinds of memory accesses in a best-effort way that is different from the Hard Object system.

[U.S. Pat. No. 7,134,050 Wenzel] isolates the objects of each module from other modules such that the objects of a module can only be operated on only by the program text of the same module, just as Hard Object does. However, modules may only communicate through a special message subsystem: "The illustrated embodiments result in a fault containment sub-environment, or set of interfaces, that surround the module instances, deliver messages, schedule execution of the module instance when a message is delivered, and manage memory key (de)activation when each instance is called." In contrast, the present Hard Object work requires no special message subsystem: modules communicate by normal function calls and no special scheduling mechanism is required; however Hard Object requires additional static analysis of software to make this module separation complete.

[EKO-1995] disclose user-readable page table entries: "The page table should be visible (read-only) at application level." User-readable and writable page table entries seem to be disclosed by [HP-1998] (the emphasis is mine):

64-bit system space refers to the portion of the entire 64-bit virtual address range that is higher than that which contains PT space. As shown in FIG. 2-2, system space is further divided into the S0, S1, and S2 spaces . . . . Addresses within system space can be created and deleted only from code that is executing in kernel mode. However, page protection for system space pages can be set up to allow any less privileged access mode read and/or write access . . . . The global page table, also known as the GPT, and the PFN database reside in the lowest-addressed portion of S2 space. By moving the GPT and PFN database to S2 space, the size of these areas is no longer constrained to a small portion of S0/S1 space. This allows OpenVMS to support much larger physical memories and much larger global sections.

The Exokernel paper, [EKO-1995], on page 4 tantalizingly refers without citation to another hardware design where there is a concept of memory addresses being owned:

> Some Silicon Graphics frame buffer hardware associates an ownership tag with each pixel . . . . The application can access the frame buffer hardware directly, because the hardware checks the ownership tag when the I/O takes place.

BRIEF SUMMARY OF THIS WORK

The present Hard Object work provides simple fine-grain hardware primitives with which software engineers can efficiently implement enforceable separation of programs into modules (code that exclusively maintains the invariants of its data), thereby providing fine-grain locality of causality to the world of software. Further, this is achieved using a hardware mechanism that seems to be significantly simpler than those in the prior art. Together with software changes, Hard Object enforces Object Oriented encapsulation semantics in hardware; that is, we make software objects hard.

In accordance with one embodiment, additions to the standard computer microprocessor architecture hardware are disclosed comprising novel page table entry fields 062 015, special registers 021 022, instructions for modifying these fields 120 122 and registers 124 126, and hardware-implemented 038 runtime checks and operations involving these fields and registers. More specifically, in the above embodiment of a Hard Object system, there is additional meta-data 061 in each page table entry beyond what it commonly holds, and each time a data load or store is issued from the CPU, and the virtual address 032 translated to the physical address 034, the Hard Object system uses its additional PTE meta-data 061 to perform memory access checks additional to those done in current systems. Together with changes to software, these access checks can be arranged carefully to provide more fine-grain access control for data than do current systems: that is, current systems only protect whole processes from each other, whereas a Hard Object system can even protect modules within a process from each other.

BRIEF DESCRIPTION OF THE DRAWINGS

FIG. 3a shows the Memory Management Unit's place in the virtual-to-physical address translation process; this figure reproduced and slightly simplified from [BO-2003, FIG. 10.2].

FIG. 3b is FIG. 3a augmented to show that the Hard Object rules are enforced in the Memory Management Unit.

FIG. 4 shows a basic page table; this figure reproduced from [BO-2003, FIG. 10.4].

FIG. 5 shows the virtual memory system being used to provide page-level process protections; this figure reproduced from [BO-2003, FIG. 10.11].

FIG. 6a shows a page table with the additional novel Hard Object meta-data embedded directly into the page table.

FIG. 6b shows a page table with the additional novel Hard Object meta-data attached indirectly to the page table using an index into a module meta-data table.

FIG. 7 shows a flow chart for Hard Object Rule H-access.

FIG. 10a shows the required Hard Object meta-data fields.

FIG. 10b shows the extension meta-data field public-readable.

FIG. 11a shows the required Hard Object registers.

FIG. 11b shows the Hard Object extension registers untrusted-start and untrusted-length.

FIG. 11c shows the Hard Object alternative embodiment registers privilege-master-start and privilege-master-end.

FIG. 12a shows the required Hard Object instructions.

FIG. 12b shows the Hard Object extension instruction branch-on-integrity-false.

FIG. 12c shows the Hard Object extension instructions set-public-readable and get-public-readable.

FIG. 12d shows the Hard Object alternative embodiment instructions set-permission-value and get-permission-value.

FIG. 12e shows the Hard Object alternative embodiment instructions make-sub-domain, del-sub-domain, attach-sub-domain, and detach-sub-domain.

FIG. 13a shows the basic organization of Mondriaan Memory Protection; it is an altered combination of reproductions of [WA-2003, FIG. 1] and [WCA-2002, table 1], which were then further modified to point out the Mondriaan meta-data permission values.

FIG. 13b is FIG. 13a with Mondriaan meta-data permission values replaced with Hard Object meta-data, showing the alternative embodiment Hybrid design with Mondriaan using only Hard Object meta-data.

FIG. 18 shows a diagram of a system architected with a privilege-master region and a system swap input/output channel separate from the normal input/output channel; this design is in the context of the alternative embodiment Generalizing to kernel protection.

FIG. 19 shows a page table with the additional novel Hard Object meta-data of both the integrity bit and the module ID embedded directly into the page table; this design is in the context of the alternative embodiment Another implementation of the same abstract technique: mapping both data addresses and text addresses to module-IDs and comparing.

FIG. 20 shows a flowchart for a data ownership check of a target address in the context of the alternative embodiment Another implementation of the same abstract technique: mapping both data addresses and text addresses to module-IDs and comparing.

LIST OF REFERENCE NUMERALS

Figure 1:
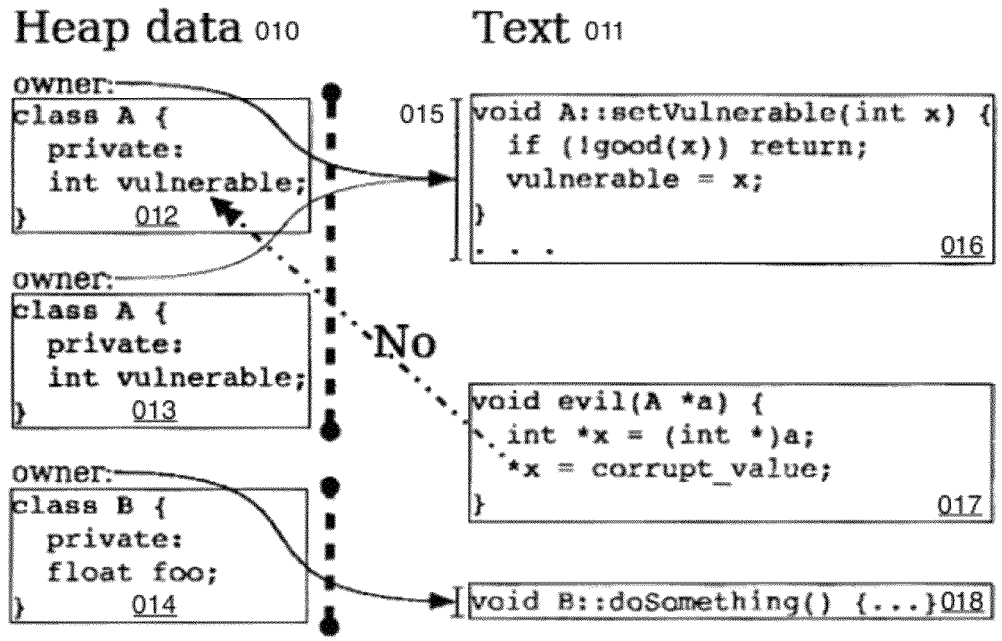
FIG. 1 shows the Hard Object heap protection feature in action.

| | |
|---|---|
| 010 | heap data addresses |
| 011 | text addresses |
| 012 | heap object under attack |
| 013 | heap object of same module as heap object 012 |
| 014 | heap object of another module |
| 015 | owner range |
| 016 | module text |
| 017 | module text of an attacking module |
| 018 | module text of another module |
| 020 | stack data |
| 021 | frame-pointer register |
| 022 | bottom-of-stack register |
| 023 | accessible stack range |
| 024 | caller function under attack |
| 025 | callee attacking function |
| 030 | CPU chip |
| 031 | CPU |
| 032 | a virtual address being looked up |
| 033 | memory management unit (MMU) |
| 034 | physical address (PA) |
| 035 | physical main memory |
| 036 | physical memory cell |
| 037 | data word being retrieved from physical main memory |
| 038 | hard object rule enforcement happening within the memory management unit |
| 040 | memory resident page table |
| 041 | page table entry |
| 042 | "valid" field of a page table entry |
| 043 | "physical page number of disk address" field of a page table entry |
| 045 | a page stored in physical memory |
| 046 | virtual memory on disk/system swap store |
| 047 | a page stored on disk |
| 050 | page tables (a collection of instances of 040 memory resident page table) shown with permission bits |
| 051 | the SUP bit field of a page table entry |
| 052 | the READ bit field of a page table entry |
| 053 | the WRITE bit field of a page table entry |
| 054 | the page table of a process; an instance of 040 memory resident page table |
| 055 | the page table of another process; an instance of 040 memory resident page table |
| 056 | an unallocated page of physical memory |
| 060 | page table with additional Hard Object meta-data fields |
| 061 | Hard Object meta-data |
| 062 | Hard Object meta-data integrity bit |
| 063 | Hard Object meta-data owner.start address |
| 064 | Hard Object meta-data owner.length unsigned integer |
| 065 | page table with additional Hard Object module-ID field |
| 066 | Hard Object module-ID page table entry field |
| 067 | module meta-data table |
| 070 | start state for checking access to data at address x by instruction at address I |
| 071 | branch if CPU in kernel mode |
| 072 | branch if address I is within the owner of address x |
| 073 | branch if x is within the accessible stack range |
| 074 | stop state resulting in an access fault |
| 075 | stop state allowing the access |
| 080 | start state for the set-owner operation taking arguments address x, address newOwnerStart, and UInt newOwnerLength called from address I |
| 081 | branch if CPU in kernel mode. Note that each such branch within an operation is unique as it is part of a different operation and results in branching to different resulting states; thus this branch is not the same as branch 071. |
| 082 | branch if address I is within the owner of address x |
| 083 | stop state resulting in a set-owner fault |
| 084 | step of clearing the integrity bit of x to false |
| 085 | step of setting the new owner of x from the arguments to the operation |
| 086 | stop state successfully completing the set-owner operation |
| 090 | start state for the set-integrity operation taking arguments address x, bit newIntegrity called from address I |
| 091 | branch if CPU in kernel mode |
| 092 | branch if address I is within the owner of address x |
| 093 | stop state resulting in a set-integrity fault |
| 094 | step of clearing setting the integrity bit of x to newIntegrity |
| 095 | stop state successfully completing the set-integrity operation |
| 100 | public-readable Hard Object meta-data bit |
| 111 | untrusted-start Hard Object register |
| 112 | untrusted-end Hard Object register |
| 113 | privilege-master-start Hard Object register |
| 114 | privilege-master-end Hard Object register |
| 120 | set-owner operation |
| 121 | get-owner operation |
| 122 | set-integrity operation |
| 123 | get-integrity operation |
| 124 | set-frame-pointer operation |
| 125 | get-frame-pointer operation |
| 126 | set-bottom-of-stack operation |
| 127 | get-bottom-of-stack operation |
| 128 | branch-on-integrity-false operation |
| 129 | branch-on-integrity-true operation |
| 12A | set-public-readable operation |
| 12B | get-public-readable operation |
| 12C | set-permission-value operation |
| 12D | get-permission-value operation |
| 12E | make-sub-domain operation |
| 12F | del-sub-domain operation |
| 12G | attach-sub-domain operation |
| 12H | detach-sub-domain operation |
| 130 | protection domain ID register |
| 131 | Mondriaan permission values |
| 132 | permissions cache |
| 133 | permissions tables |
| 134 | a single permission value |
| 135 | meaning of Mondriaan permission values |
| 136 | multiple instances of Hard Object meta-data as stored in the meta-data table 138 or cache 137 |
| 137 | meta-data cache |
| 138 | meta-data table |
| 140 | protection domain ID map |
| 141 | process id |
| 142 | instruction address |
| 143 | protection domain ID |
| 144 | Instance-O cache |
| 145 | Instance-P cache |
| 146 | Instance-O table |
| 147 | Instance-P tables |

| | |
|---|---|
| 148 | page table having a protection domain ID field |
| 149 | page tables, each one having a protection domain ID field |
| 14A | protection domain ID page table field |
| 150 | start state for the set-permission-value operation taking arguments domain ID d, address x, permission value p, called from address I |
| 151 | branch if CPU in kernel mode |
| 152 | step of looking up Instance-O Hard Object ownership meta-data for address x |
| 153 | branch if address I is within that owner |
| 154 | stop state resulting in a set-permission-value fault |
| 155 | step of using the domain ID d to look up which Instance-P permissions to use |
| 156 | step of looking up the permission value entry for address x in that permissions table |
| 157 | step of setting the permission value for that entry to permission value p |
| 158 | stop state successfully completing the set-permission-value operation |
| 160 | start state for checking access to data at address x by instruction at address I within the context of the "Hybrid design with Mondriaan using Hard Object ownership and Mondriaan permissions" |
| 161 | branch if CPU in kernel mode |
| 162 | step of mapping the instruction address I through the protection domain ID map to get the EPDID |
| 163 | step of using the EPDID to find what Instance-P permissions table to use |
| 164 | step of looking up the Mondriaan permission value for address x in the instance-P permissions table |
| 165 | branch if the permission value allows the access |
| 166 | branch if x is within the accessible stack range |
| 167 | stop state resulting in an access fault within the context of the "Hybrid design with Mondriaan using Hard Object ownership and Mondriaan permissions" |
| 168 | stop state allowing the access within the context of the "Hybrid design with Mondriaan using Hard Object ownership and Mondriaan permissions" |
| 170 | address of cell in virtual memory |
| 171 | Instance-P permissions table for domain ID 1 |
| 172 | address range start for a range of virtual memory data addresses |
| 173 | a permission value or a pointer to a permission sub-table |
| 174 | Instance-P permissions table for domain ID 2 |
| 175 | Instance-P permissions sub-table for domain ID 3 |
| 176 | start field for an Instance-P permissions sub-table |
| 177 | length field for an Instance-P permissions sub-table |
| 178 | Instance-O Hard Object ownership table |
| 180 | system swap input/output channel |
| 181 | normal input/output channel |
| 182 | privilege-master region |
| 183 | other, non-privilege-master region, memory |
| 184 | system swap bus |
| 185 | system swap store |
| 186 | normal input/output bus |
| 187 | disk other than the system swap store attached to the normal input/output bus |
| 188 | user file-system on the disk 187 |
| 189 | keyboard attached to the normal input/output bus |
| 18A | mouse attached to the normal input/output bus |
| 18B | monitor attached to the normal input/output bus |
| 190 | page table with additional Hard Object integrity bit field and additional Hard Object module-ID field |
| 191 | start state for checking ownership of data at address x by instruction at address I within the context of "Another implementation of the same abstract technique: mapping both data addresses and text addresses to module-IDs and comparing" |
| 192 | step of getting the data module-ID of the data address, x, from the PTE of the page of the data address |
| 193 | step of getting the instruction module-ID of the instruction address, I, from the PTE of the page of the instruction address |
| 194 | branch if the data module-ID is the same as the instruction module-ID |
| 195 | stop state resulting in NO within the context of "Another implementation of the same abstract technique: mapping both data addresses and text addresses to module-IDs and comparing" |
| 196 | stop state resulting in YES within the context of "Another implementation of the same abstract technique: mapping both data addresses and text addresses to module-IDs and comparing" |

DETAILED DESCRIPTION AND OPERATION

In accordance with one embodiment, Hard Object comprises
(1) the features below being present a microprocessor architecture, including
(2) enforcement in the MMU of the rules below, mediating access to data and meta-data.

Features

The following hardware features are required to be present.
(a) Hard Object meta-data fields 061 of a page table entry (PTE); see FIG. 10*a* for a list and FIG. 6*a* to see a page table with these features added:
(1) an "integrity" bit 062, and
(2) an "owner" address range 015, comprising:
(i) an "owner.start" memory address 063 and
(ii) an "owner.length" unsigned integer 064.
(b) Two special registers; see FIG. 11*a:*
(1) A "frame-pointer" register 021 which points to the top of the current frame.
(2) A "bottom-of-stack" register 022 which points to the maximum extent of the stack.
(c) Set 120 122 124 126 and get 121 123 125 127 instructions to manipulate these above-mentioned PTE-fields 061 and registers 021 022; see FIG. 12*a*.
(d) Hardware checks and operations done by the Memory Management Unit (MMU) 033, using the above-mentioned PTE-fields and registers, that are performed 038 at each PTE-field, register, and memory access, which enforce the below rules; see FIG. 3*b*.

Terminology and Notation

When referring to the memory addresses, virtual, rather than physical addresses, are meant. Without loss of generality it is a assumed that the stack grows downwardly in the address space.

A "bit" is a binary digit: zero or one. An "address" is a word-length sequence of bits which when interpreted by the Memory Management Unit determines a unique cell in virtual memory. An "unsigned integer" or "uint" is a word-length sequence of bits that can be used in fixed-point arithmetic subject to its size limit; the only use we put them to is to add an address to a uint to obtain another address. We denote a pair of two kinds of data by conjoining them with an infix "*"; for example a pair consisting of an address and a uint would be denoted "address * uint". When formally defining a new computer instruction, the instruction interface is given in a notation similar to that of the C language:

ReturnType instruction-name(ArgumentType1 argument1, . . . ).

If the instruction returns no value, the ReturnType is omitted.

"PTE" means page table entry 041. A data page is "owned" by the text (executable program code) delimited by the text pages that are delimited by the owner address range 015 of the data page. Addresses between the frame-pointer 021 and the bottom-of-stack 022 are "in frame" 023. For a page table entry P, let "P.integrity" 062, "P.owner.start" 063 and "P.owner.length" 064, denote respectively the fields of P named by the name after the first dot. "PC" means the program counter.

A data "access" is an attempt to read or write data to or from a memory address and the address accessed is the "target" of the access. For a memory address x, let "x.P" denote the page table entry of x. "FAULT" means an error condition in which the attempted operation is disallowed and at which point the processor invokes an error procedure. The present work is operationally described without specification of any particular form for the FAULT error procedure. "ALLOW" means the operation continues without interruption.

Rules

In the Hard Object design the Memory Management Unit (MMU) implements the two general rules and respective sub-rules given below; see FIGS. 3a and 3b. These rules are stated textually in quotes and then stated again procedurally.

H-access—see FIG. 7: On an access to data at an address x by an instruction located at address I, these checks are made.

("Kernel can access data at any address.")
(1) 071 If in kernel mode, ALLOW the access.
("Allow if the instruction owns the target.")
(2) 072 Otherwise, if x.P.owner.start<=I<x.P.owner.start+x.P.owner.length, ALLOW.
("Allow if the target is in frame.")
(3) 073 Otherwise, if frame-pointer >=x>bottom-of-stack, ALLOW.
("Access is opt-in.")
(4) 074 Otherwise, FAULT.

Figure 8:
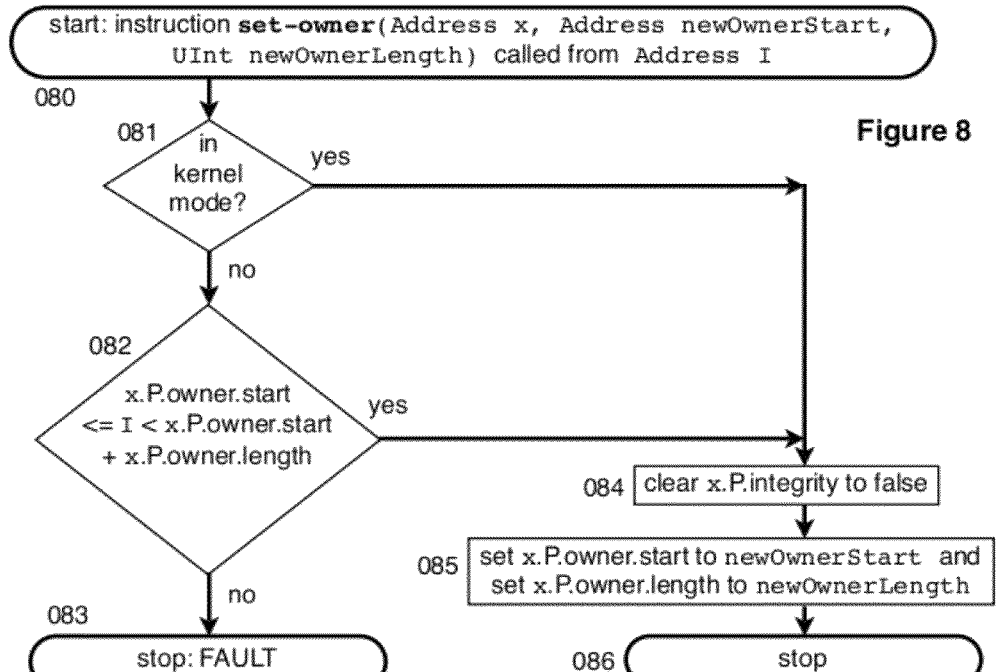
FIG. 8 shows a flow chart for Hard Object Rule H-owner for instruction set-owner.
Figure 9:
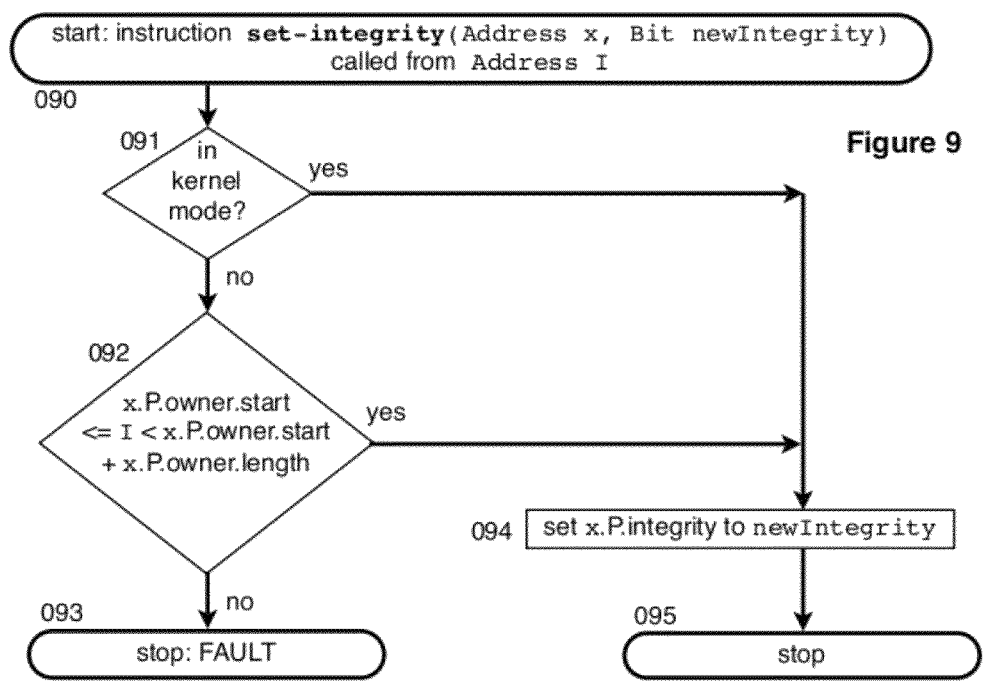
FIG. 9 shows a flow chart for Hard Object Rule H-owner for instruction set-integrity.

H-owner—see FIGS. 8 and 9:

("Other than the kernel, only the page owner can set page's integrity or owner")
(a) When an instruction executes to set either the integrity 062 or owner 015 (the owner.start 063 and owner.length 064) fields on a page P, the following check is made:
(1) 081/091 If in kernel mode, ALLOW.
(2) 082/092 Otherwise if P.owner.start<=I<P.owner.start+P.owner.length, ALLOW.
(3) 083/093 Otherwise FAULT.
("On an ownership change, the integrity bit is cleared to false.")
(b) 084 When the instruction to set the owner field (the owner.start and owner.length) on a page P executes, the P.integrity field is cleared to false.

Partitioning Programs into Modules

Programmers follow certain disciplines designed to reduce mistakes, a common one being "modularity"—a software embodiment of locality of causality mentioned above: programs are separated into parts called "modules" where each module has its own data together with code to manage it. Further, to ensure correctness, the module's code is written in such a way as to maintain certain "data invariants": properties of the module data which are always true.

The point of the Hard Object design is to enforce this partitioning of programs into mutually un-trusting modules so that they may nevertheless operate together in the same address space without danger to one another. That is, the Hard Object hardware provides sufficient mechanisms to allow software to ensure that one module, M1, may not modify the data of another module, M2, nor may trick module M2 into accepting as its own data that does not satisfy the data invariants of module M2.

Note that in order to make such module separation complete, additions to both standard hardware and software are required. That is, the Hard Object mechanism provides only basic hardware primitives for use by software. The software of both (1) the programmer's compiler and (2) the operating system and libraries on which the program runs must make use of the Hard Object hardware primitives in rather sophisticated ways if a guaranteed separation of one module from another as described above is to be achieved at run-time. Such sophisticated modifications to the compiler and operating system are more extensive than the hardware primitives provided here and are outside the scope of this document.

It is the practice of most compilers to organize programs, and hence modules, into (a) text (executable program code), (b) heap 010/global data and (c) stack data 200. Below mechanisms are given in turn that allow for protection of each of these parts of a module.

Protecting Module Text

The Hard Object system relies on the standard prior art partition of all virtual pages into either text or data pages. As covered in the Background section, this is accomplished using read-only 052 and execute meta-data bits in the PTE. The result is that only text pages may execute and only data pages can be written by user processes. This prior art feature is current practice in some architectures and not an innovation herein of Hard Object; however it is not completely standard and this feature is needed for the functionality of Hard Object to be complete so we re-state it for completeness.

Protecting Module Heap and Global Data

Modules have heap and global state that needs to be protected from access by other modules; see FIG. 1.

To this end the Hard Object design provides for ownership of memory addresses by executable program code (text) as follows. In the first embodiment, each virtual page is annotated with a contiguous range 015 of text instructions called the "owner" of the page; see FIGS. 6a and 10a. The text within that range "owns" the page and can manipulate it: that is, when an instruction attempts to access data on a page, the access is allowed 072 if and only if the address of the instruction is within that owner range 015; see FIGS. 1 and 7. A module may store its data on pages that are owned only by itself. The author of the module may thereby ensure any "data invariants" of the data on those pages.

In a Hard Object system, ownership of a data page may be changed or "transferred" from one module to another by setting the page owner field. The process of changing ownership is an operation that may be accomplished through an operation the execution of one or more processor instructions; see FIG. 12a. When initiated in kernel mode, this operation may change ownership of any page without restriction 081. When initiated in any mode other than kernel mode (e.g. user-mode), only the current owner of a data page may 082 change the ownership of said page. See FIG. 8

Consider the scenario where module M1 writes to a data page D and then transfers the ownership to module M2. Module M2 needs a way to recognize that it is a new owner of page D which may contain data that does not satisfy the invariants that M2 requires of its data. The Hard Object system provides a bit for this purpose in the form of the "integrity" field 062 of page D (see FIG. 10*a*), as follows. When ownership is transferred, the integrity bit is cleared to false 084 by the Hard Object hardware and may only be set to true again 092 by the new owner M2; see FIGS. 8 and 9. Presumably M2 would only do this after it has inspected the page D and verified that the data invariants of M2 hold of the page D. The new owner M2 can always choose to ignore the integrity bit if M2 does not maintain any special invariants on its data.

Protecting Module Stack Data

Module functions have temporary stack data that must be protected as well. For modules to interact efficiently, a caller function 024 of one module must be allowed to call a callee function of another module that it does not trust 025. The stack data of the caller function will remain on the stack while the callee function runs and therefore the caller stack data needs to be protected from the callee; see FIG. 2.

To provide stack protection, two user-mode registers are required that delimit the currently accessible part of the program stack (for one thread) as follows (see FIG. 11*a*):

(1) a "frame-pointer" register 021 that points to the top of the current stack frame and changes with each function call and return, and (2) a "bottom-of-stack" register 022 that points to the maximum allowed extent of the stack.

Note that when considering the terms "top" and "bottom" of the stack, recall that we assume without loss of generality that the stack grows downwardly in terms of memory address values; that is, unless the stack has overflowed, frame-pointer>=bottom-of-stack. Note that the bottom-of-stack register is not the commonly-known prior art "stack pointer" which points to the bottom of the current function's stack frame. Note however the frame-pointer register is the commonly known prior-art "frame-pointer" that points to the top of the current stack frame, though with semantics modified to our purposes; see below.

The Hard Object system also adds to the typical instruction set instructions to set 124 126 and get 125 127 these novel registers: at minimum, instructions are required to move data between conventional general-purpose registers and the novel Hard Object registers; see FIG. 12*a*.

The temporary stack variables of functions both reside on the stack, and so the owner of the stack pages should be neither module, and in fact should be a special "nobody" owner indicating ownership by no user-mode module. However the current function needs to be able to access the stack. Therefore we consider the frame-pointer register and the bottom-of-stack pointer register to be delimiting an "accessible stack range" 023 where the current function may always access the data located at data addresses within the accessible stack range. Specifically, as shown in FIG. 7, a data access instruction is allowed (a) 072 if the accessing instruction is in the ownership range of the target address OR (b) 073 if the target address is within these two stack-delimiting registers.

That is, these stack-delimiting registers provide an accessible stack range 023 of addresses that a function may access in addition to the heap pages that are owned by the function's module, namely the function's own stack frame.

The common practice in prior art systems is that the normal course of a function call when control transfers from the caller function to the callee function, the frame-pointer is also moved from pointing to the top of the caller stack frame to point to the top of the callee stack frame. Upon the return of the callee function, the reverse is done. We leave this prior art function call protocol unchanged; however we give the frame-pointer more meaning by using it to mark the part of the stack above it as off-limits to the current function; see FIG. 2.

Interaction with Caching

Hard Object is easily integrated with processors that utilize physically addressed caches. In such processors, each access is passed through a virtual-to-physical address mapping before being passed to the cache. Consequently, Hard Object rules may be validated during the mapping process, independently of the cache architecture. Faults resulting from Hard Object rules may be handled identically to faults from the virtual memory system. Thus, the cache may be implemented in the conventional manner. Note that physical addressing is the usual case: [BO-2003, section 10.6.1] "[M]ost systems opt for physical addressing."

Hard Object is a bit more challenging to integrate with processors that utilize virtually addressed caches. In such processors, the virtual-to-physical mapping is only consulted during cache misses; if a memory datum is already stored in the cache, then the processor can access it without checking auxiliary structures (such as a page table). Hard Object requires different behavior: an access to data at a target address must either succeed or fault depending on whether or not it is being accessed by its owner—regardless of whether or not it is present in the cache.

The simplest way to integrate Hard Object with a virtually addressed cache is to augment the cache tags with Hard Object meta-data annotations of the same form as those in the PTEs. These annotations would be loaded during cache-fill operations. During a cache lookup, two things would occur: the address would be checked against the tag address (normal behavior) and the Hard Object rules would be checked using the Hard Object meta-data (new behavior). This simple solution has two serious disadvantages. First, the cost of storing Hard Object meta-data for every cache line could be prohibitive, although this problem would be mediated somewhat by using the protection domain ID concept discussed in the alternate embodiments section. Second, when the Hard Object meta-data of a page changes (such as during ownership change or memory allocation), cached items from the page must be either flushed from the cache or otherwise updated to reflect the new meta-data.

A better solution for integrating Hard Object with a virtually addressed cache would be to introduce a separate Hard Object rule checker that examined each address access, in parallel with cache lookup. Such a rule checker would show many similarities to the standard virtual-to-physical address mapping mechanism, since it would perform Hard Object rule checking by fetching Hard Object meta-data from the PTE (if it is stored in the page table) or from a separate Hard Object meta-data table. Unlike the solution given in the previous paragraph, this configuration exhibits the same storage requirements as with a system utilizing physically addressed caches and provides a simple mechanism for changing ownership of a page: modify the meta-data in a single place. Further, the rule checker can notify the processor of Hard Object faults either (a) before the processor begins utilizing the cached data or (b) after the processor begins utilizing the cached data, as long as the processor provides a mechanism for aborting any instructions that consumed the cached data before it commits its results (a mechanism commonly present in pipelined processors).

Interaction with Registers and the Calling Sequence

Registers are a different concern from caches, as they have no associated memory address, unlike a cache-line. Registers may be implemented in the usual way without needing any changes due to being part of the present Hard Object design. Normally, registers are not shared across function calls, other than for argument passing and value return; however for functions in mutually un-trusting modules to be able to call each other safely, software, such as the system loader software, must perform a static safety analysis of the program at program load time. Such an analysis must guarantee that the program pushes and pops the frame-pointer and saves and restores registers according to a specified protocol and the protocol in turn must insure that one function does not access values in a register that is also being used by a suspended function, unless those registers were being used for explicit argument passing. Note that adhering to register and stack management protocols at function call boundaries is already standard industry practice. Such a static safety analysis is beyond the hardware primitives provided here and are outside the scope of this document.

Hard Object Mechanisms in Action

The active operation of the present Hard Object protection mechanisms in action is further illustrated in the following scenarios, accompanied by figures.

FIG. 1 shows the heap protection feature preventing the function evil( ) 017 from violating the integrity of an object of class A 012. On the left is some heap data 010 and on the right some text 011 addresses. The owner field on each heap page points to the text range 015 that owns it; note that there can be more than one object per page (owned by the same owner) as all objects of one class are owned by the same class (module) code, however this amount of generality is not shown in the diagram. The double-headed dashed line indicates a failed access by a function 017 to a heap page 012 that it does not own. The access fails because it comes from a text address that is not in the owner range 015 of the heap page containing the address that the access targets.

Another more subtle kind of attack can be made by module M1 on module M2 as follows. Module M1 creates a heap data 010 page D that is subtly corrupt and if M2 were to treat this page as its own then M2 might do something self-destructive. More precisely M1 creates a heap data page that does not adhere to all of the data invariants of module M2. M1 then calls set-owner 120 on D, transferring ownership of D to M2; however notice in FIG. 8 that at the same time set-owner also clears the integrity bit 084 on D to zero. M1 then calls a function M2::f( ) in M2 asking module M2 to perform an operation on the data on page D. If M2 were to do this something undesired by the author of module M2 might happen. However the author of M2 has inserted code at the top of function M2::f( ) to call get-integrity 123 (or the optimized version branch-on-integrity-false 128 in FIG. 12b; see below) on page D and detects that the integrity bit 084 is zero and therefore refuses to operate on this data, thereby avoiding the attack.

Figure 2:
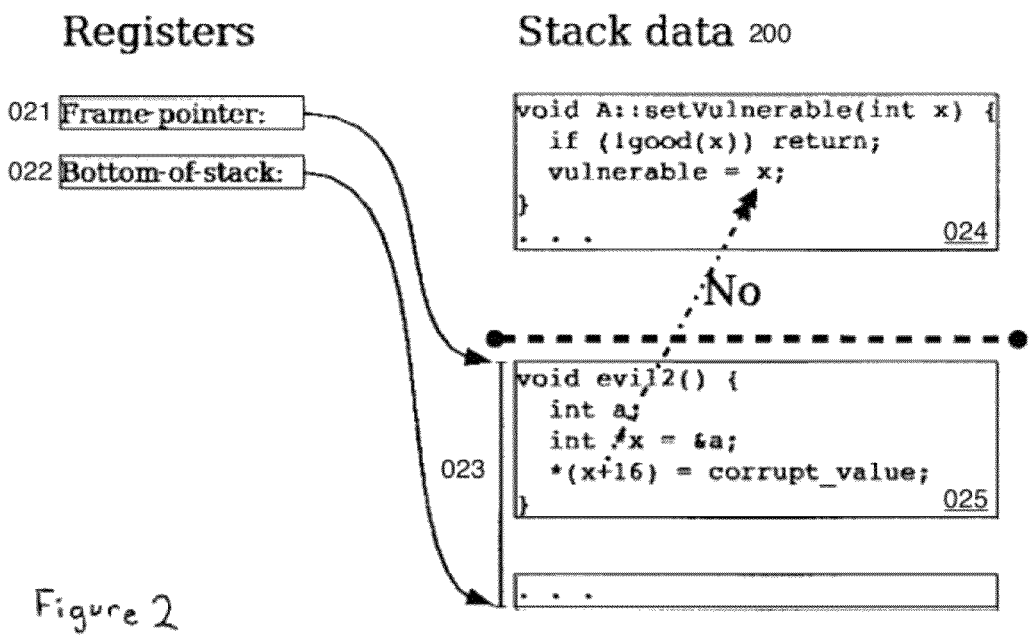
FIG. 2 shows the Hard Object stack protection feature in action.

FIG. 2 shows the stack protection feature preventing the function evil2( ) 025 from violating the integrity of the stack frame of function A::setVulnerable( ) 024. On the left we see some CPU registers 021 022 and on the right some stack data 200. The frame-pointer 021 and bottom-of-stack 022 registers delimit the currently accessible range 023 of the stack. The double-headed dashed line indicates a failed access by the function evil2( ) 025 to the stack frame of A::setVulnerable( ) 024. The access fails because it targets an address not in the currently accessible range 023 of the stack.

Detailed Description and Operation

Enhancements to First Embodiment

The mechanisms of the first embodiment can be enhanced to provide more functionality or better performance, as follows.

Restricting Hard Object Instructions to Kernel Mode and Wrapping them with System Calls Any of the novel Hard Object hardware instructions can also be implemented with the additional restriction that they operate only when the CPU is in kernel mode. User processes could still have a means to take the actions provided by the operations if these operations were wrapped with system calls and the actual hardware instructions were run within that system call at the request of the user process by the kernel. In this case the check "if in kernel mode, ALLOW" now becomes "if this operation is not being done at the request of a user process, ALLOW". Further, this modified check is done by the kernel software within the system call before the execution of the rest of the steps of the operation are performed by a call to the actual hardware instruction.

Frame Pointer Offset

Note that an alternative embodiment allows the frame-pointer to be offset by a constant number of words from how it is described here in order to make simpler or more efficient the resulting function call protocol.

Branch-On-Integrity-False Instruction 128

Since the integrity bit will be checked often and since there is only a single bit of meta-data to check, one embodiment implements an optimization for the common use of the get-integrity instruction 123 as a single "branch on integrity false" instruction, 128 branch-on-integrity-false(Address x, Address jumpTo)

to be used instead of the typical sequence of a register load followed by a test and then a branch; see FIG. 12b.

Private Text

It may also be useful to prevent another module from reading of even the text pages of other modules. This could be accomplished by adding the following restriction to be checked in the MMU: when not in kernel mode, data from a text page of memory can only be loaded into the CPU instruction decoder and not into any other registers (such as the general-purpose registers that a program can inspect and manipulate). Note that for this method to work compilers would have to write jump tables into data pages instead of text pages.

An alternative embodiment of this enhancement is that, when not in kernel mode, the text on a page can only be read by an instruction the address of which is in the same page. This embodiment would allow jump tables to be stored in a page and accessed from the same page as long as the compiler and loader ensured that a page boundary did not intervene. Either arrangement would require the system loader run in kernel mode so that programs could be loaded and linked (and possibly further inspected) before running Public-Readable Bit 100

For a module M2 to allow another module M1 to read some of M2's heap or global data is usually much less dangerous than allowing M1 to write the same data addresses. It is also common for one module author to wish to allow other modules to do this. However the ownership mechanisms outlined so far only allow both reading and writing, or neither. One solution is for M2 to have a function that simply reads the data at a given address and returns its value to the caller (by copying the value onto the stack); call such a function an "accessor function". Forcing M1 to expend the overhead of a function call to an accessor function simply to read the data of M2 when the author of M2 does not wish to keep the data private is an unfortunate inefficiency.

To alleviate this problem, an extension of Hard Object provides an additional meta-data field called the "public-readable" bit 100; see FIG. 10b. The semantics are that any read access to such a page is allowed, while write accesses would still be prohibited unless they first pass the usual Hard Object tests. This extension also provides user-mode instructions 12A set-public-readable(Address x, Bit newPublicReadable)

and 12B

Bit get-public-readable(Address x), see FIG. 12c. These set/get-public-readable instructions only function when the CPU is in kernel mode, or when the address of the instruction is within the owner text of the argument address x.

The Untrusted-Region Exception to the Public-Readable Bit

Sometimes users wish to run programs that are untrusted, such as a program just downloaded off of the network. A common prior art technique is to run such a program in a restricted environment called a "sandbox". To enable this technique to be used for modules within the same program, an extension to Hard Object provides a system-wide exception to the public-readable bit (above) as follows. An "untrusted region" of memory is set aside for such very untrusted programs, delimited by two special registers "untrusted-start" 111 and "untrusted-end" 112. When accessed from an instruction the address of which is in this region, even the public-readable bit is inoperable. See FIG. 11b.

Detailed Description and Operation

Other Embodiments

Several other embodiments of Hard Object are possible that may provide more efficiency or functionality.
Optimizing and Generalizing the Owner Range There are various alternatives to the presentation of the owner range part of the Hard Object meta-data.
Two Absolute Addresses An alternative embodiment delimits the owner range of a page with two absolute addresses instead of an absolute address and a relative length.
Delimit Text Range at the Page-Granularity An alternative embodiment requires that the owner of the text range of a data page also be delimited at the page-granularity. Far fewer bits are then needed: for a 32-bit machine, an owner.start and an owner.length that can delimit the owner range to the word-granularity is 30+30=60 bits. If the machine has 4K-sized pages, which is typical, and the owner range must start and stop on a page boundary, then only 20+20=40 bits suffice for the owner range. Note that text memory fragmentation results if modules are less than a page in size; this is unlikely to be a problem unless there are very many very small modules and memory is highly constrained.
Floating Point Owner.Length An alternative embodiment uses floating point, rather than fixed point, notation to represent the owner.length. Since the length is a non-negative integer the mantissa is a non-negative integer and therefore an unsigned representation can be used. Note that the size represented by the smallest exponent can be calibrated to the single word or the single page or anything else. It may be useful to delimit module lengths to the single-page-granularity for small modules as a wasted page of extra length would be a high percentage of waste in terms of the total length of the module; however really large modules could be delimited in larger units consisting of multiple pages and any unused pages (due to rounding up on the module length to fit the larger unit of granularity) would be a lower overall percentage of wasted space. Such a floating point notation therefore can allow a smaller total number of bits for the total representation length; instead of using 20 to count all possible page lengths, using instead say 7 bits for the mantissa and 4 bits for the exponent would guarantee a percentage of wasted space of less than 1% while using only 7+4=11 bits instead of 20.
Floating Point Owner.Start An alternative embodiment represents the owner. start in floating point in the above manner. Memory fragmentation considerations make it natural to allocate those modules close to one another that have owner range sizes that are of the same order of magnitude, a scheme reminiscent of the "buddy system" method of memory allocation. That is, the memory allocator puts modules with small ranges and small exponents at the bottom of memory, the medium sized ranges next, etc. Now the owner range start and length can share the same exponent or participate in a one-parameter family of related exponent pairs. Thus on a 32-bit machine the entire start and length range together could take as little as say 7+7+4=18 bits.
Add a Layer of Indirection Through a Module Meta-Data Table An alternative embodiment drops the requirement of using two machine words 063 064 of data in a page table entry to denote the owner text as a literal memory range. Instead a "module identifier" (module-ID) 066 is stored in the PTE of data pages that are owned by a particular module. We can think of this map from a data address to its module-ID as implementing a "module-ID table", though we use the existing page table to do it.

This module-ID indirects into a new hardware "module meta-data table" 067 to look up the actual owner.start 063 and owner.length 064; see FIG. 6b. While the lookup might not be implementable without making the check be slower, the number of bits in the module-ID 066 could be far fewer as the number of modules in any real program would likely be far fewer than a direct representation of the owner range, as discussed above. The number of modules could be limited to only, say, one thousand per program, which would require a module-ID 066 of only log 2(1000)<=10 bits. Along these lines the [U.S. Pat. No. 5,890,189 Nozue, et al.] design contains a region number protection unit to map the an instruction address to a region number:

FIG. 38 . . . a region number detection unit 267 detects the region number of the region at which the currently executed program is present, and the ACL entry having the same region number as this region number of the region at which the currently executed program is present is selected from the selected page table entry.

This mechanism could be used in an alternative embodiment of Hard Object to reduce the number of bits stored in the page table entries.
Another Implementation of the Same Abstract Technique: Mapping Both Data Addresses and Text Addresses to Module-IDs and Comparing Another embodiment uses module-IDs in a slightly different way. All page table entries 190 contain an integrity bit 062 and a module-ID 066; see FIG. 19. To determine if a data address is owned by a text (instruction) address (see FIG. 20):

(1) 192 Get the data module-ID 066 of the data address from the PTE 190 of the page of the data address.

(2) 193 Get the instruction module-ID 066 of the instruction address from the PTE 190 of the page of the instruction address.

(3) 194 The data address is owned by the instruction address if the data module-ID is the same as the instruction module-ID.

No matter which direction you compute the two associations above, the general technique works. That is, we can reverse the direction of the lookup given in step (2): take the data module-ID and looking up the associated instructions. Looked at this way, we get the previous embodiment again: That is, we can think of step (1) as associating a data module-ID with a data address using a "module-ID table" and of step (2) as associating owner instruction addresses with the module-ID using a "module meta-data table".

The Owner as a Union of Multiple Discontiguous Text Ranges

An alternative embodiment drops the requirement that the owner text of a memory address needs to be a contiguous range: multiple address ranges could be provided and the owner defined to be their union. This embodiment is much more feasible in conjunction with the previous one where an owner is represented indirectly as an owner ID indexing into a table. The representation is therefore more space efficient as an owner having a long representation (consisting of multiple address ranges) need only be specified in a single table entry.

Reducing Memory Fragmentation Using Smaller Page Sizes

Some recent architectures, such as those by Intel, now allow for huge pages of up to 2 Gigabytes. Since in a Hard Object system heap pages are allocated to a module at the heap granularity, use of Hard Object with such architectures might result in an inconveniently-large heap region being allocated per module, as even one page would be too large for most modules. An alternative embodiment provides a solution as follows: pages are subdivided into multiple chunks for the purposes of Hard Object annotation and each chunk gets its own Hard Object meta-data in the page table entry. The cost of this design would be offset by the fewer number of page table entries needed when such large pages are used span the same amount of memory.

Hybrid Design with Mondriaan Using Only Hard Object Meta-Data

Mondriaan Memory Protection [W-2004] is a memory protection technique that can be easily seen as comprising several separate parts as follows; see FIG. 13a.

(M1) A "permissions table" mechanism for associating meta-data (here Mondriaan permission values) 131 with addresses at the word-granularity (M2) Multiple tables 133, one per "protection domain", and (M3) Meta-data encoding read, write, and execute permissions 135 and rules enforced in the MMU to allow read/write/execute operations to the addresses when the associated permissions allow it.

An alternative embodiment of Hard Object comprises the following parts; see FIG. 13b.

(H1) A single instance of the permissions table mechanism of (M1) above, which annotates addresses with meta-data.

(H2) The Hard Object meta-data 061 (which in the first Hard Object embodiment is contained in the PTE-fields) instead of the Mondriaan read/write/execute bits. This permissions table mechanism has been repurposed to annotate addresses with Hard Object meta-data 061 (multiple instances in a table being 136), we call it a "meta-data table" 138. This embodiment does not use the Mondriaan mechanisms (M2) and (M3) above. This embodiment also does not use the Mondriaan Protection Domain ID register, as this embodiment needs only one meta-data table 138.

Hard Object rules are enforced 038 by the Memory Management Unit as follows.

(a) When an access to data at a target address is requested by the CPU 031, the MMU gets the meta-data 061 associated with that address using the meta-data table 138 (or the cache 137), which again is just the repurposed Mondriaan Memory Protection permissions table mechanism.

(b) As that meta-data is Hard Object meta-data 061, and the Hard Object data access rules are enforced 038 in the MMU as in the first Hard Object embodiment previously described.

That is, in this embodiment, the (b) Hard Object style data protections are provided as in the first embodiment, but at the (a) word-granularity instead of the page-granularity. The cost to provide this extension to Hard Object is the implementation of one instance of the Mondriaan permissions table mechanism.

On an attempted access to data by an instruction both the prior art Mondriaan design and this Hard Object embodiment use two inputs to compute the associated permissions that allow or deny the access: (1) the target address and (2) one other parameter. In this Hard Object embodiment this other parameter is simply the address of the instruction attempting the access, whereas in the Mondriaan design this other parameter is the value of a special-purpose Protection Domain ID register 130. An important difference is that changes in the program counter require no special management as they happen naturally as part of the computation process, whereas the Mondriaan design suffers from considerable additional complexity as a consequence of the need to explicitly manage this Protection Domain ID register.

This Hard Object embodiment presents an improvement and simplification of the Mondriaan design: This embodiment uses one single Mondriaan-style permissions table mechanism 138 to associate meta-data to memory addresses and thus the Mondriaan design the mechanism for associating different meta-data to memory addresses per a separate protection domain ID is dropped. The semantics of the Hard Object meta-data and rules do not require any changes to any kind of permissions meta-data on a cross-domain call nor any of the other complexity attending the management of a separate protection domain ID. This simplification alleviates one of the biggest complexities of the Mondriaan design while still retaining its ability to annotate addresses with meta-data at the word- (rather than page-) granularity.

Hybrid Design with Mondriaan Using Hard Object Ownership and Mondriaan Permissions This alternative embodiment separates the concepts of (1) memory address ownership and (2) memory address access permissions.

Only the owner of a memory address may set its access permissions; these permissions are then used to control read and write access to the address. Therefore the owner of an address may allow or deny access by another module while always retaining ownership. (In particular the special "nobody" owner of the stack explicitly denies all access permissions; thus, as usual, access to the stack is only allowed because stack addresses are "in frame".) Such a design has the advantage of allowing for a very rich and flexible address-access semantics such as those Instance-O: Computing Memory Address Ownership Address ownership can be provided using either the technique disclosed in the first embodiment of Hard Object or the technique of the immediately-previous alternative embodiment Hybrid design with Mondriaan using only Hard Object meta-data. Either technique associates addresses to Hard Object meta-data, providing an owner set of program text. The first technique does this association at the page-granularity and the second technique at the word-granularity. However in order to exhibit the most elaborate embodiment we choose the second method: associating addresses to meta-data at the word-granularity. Recall that this association is performed using a single instance of the meta-data table, a repurposed Mondriaan permissions table mechanism.

Subsequent features of this embodiment will use a separate instance of the Mondriaan permissions table design in a separate role. In this embodiment, to avoid confusion, this first instance of a single Mondriaan permissions table mechanism to associate addresses to Hard Object meta-data for purposes of computing ownership only (meta-data table) is called Instance-O (for ownership) 146 144. Again, we use Instance-O for computing address ownership purposes only, not for computing data access permissions.

Instance-P: Computing Data Access Permissions

Data access permissions are provided by further including into this embodiment a second instance of the original Mondriaan design. This instance annotates addresses
  (1) with Mondriaan permission values (not Hard Object meta-data)
  (2) across multiple protection domains using multiple permissions tables just as in the original Mondriaan design. However this instance of the Mondriaan design still does not use the protection domain ID register. This second instance of Mondriaan permissions tables is used to associate addresses to Mondriaan permission values only for the purpose of computing the allowability of data access. In this embodiment, to avoid confusion, this second instance of Mondriaan permissions tables is called Instance-P (for permission) 147 145. Again, we use Instance-P for computing data read/write access permissions purposes only, not for computing memory address ownership.

Determining the Current Effective Protection Domain ID Using a Novel Protection Domain ID Map The original prior art Mondriaan design further requires a hardware register called the "protection domain ID" [WCA-2002, section 3.2] 130 which determines the currently effective permissions table. In the original Mondriaan design, this protection domain ID must be changed whenever the domain is changed, such as on a cross-domain function call using a call gate or when control is switched from one thread to another.

In this embodiment we do not use the protection domain ID register. Instead at each instruction execution we compute an "effective protection domain ID" (EPDID) from the address of the instruction, as follows. We use a novel "protection domain ID map" 140 to associate a program text address to a protection domain ID. At any given instruction execution, the current protection domain ID is determined by the microprocessor by looking up the address of the instruction in the protection domain ID map. Various embodiments of this map are given below.

On modern computers the pages of virtual memory which hold the program text are initialized and marked read-only by the operating system when the process is started and these pages cannot be changed by the program as it runs. The protection domain ID map 140 implements the association of particular subsets of these program text pages to a particular protection domain ID. Given the usual organization of a program into modules, there is really no need for this association to change while the program runs and therefore no user-mode mechanism is necessary for the program to request such changes. Thus the operating system should set up the protection domain ID map at process initialization when the text pages are loaded. It is natural for the compiler(s), which generated the program, to also annotate the program with the map.

Ownership Rules Use Instance-O Hard Object Meta-Data

Set/get-owner and set/get-integrity instructions work exactly as in the previous alternative embodiment Hybrid design with Mondriaan using only Hard Object meta-data and operate on Instance-O Hard Object meta-data.

This embodiment further provides user-mode instructions for setting the Instance-P Mondriaan permission values; see FIG. 12*d*: 12C
  set-permission-value(DomainID d, Address x, PermissionValue p)
and 12D
  PermissionValue get-permission-value(DomainID d, Address x).

Figure 15:
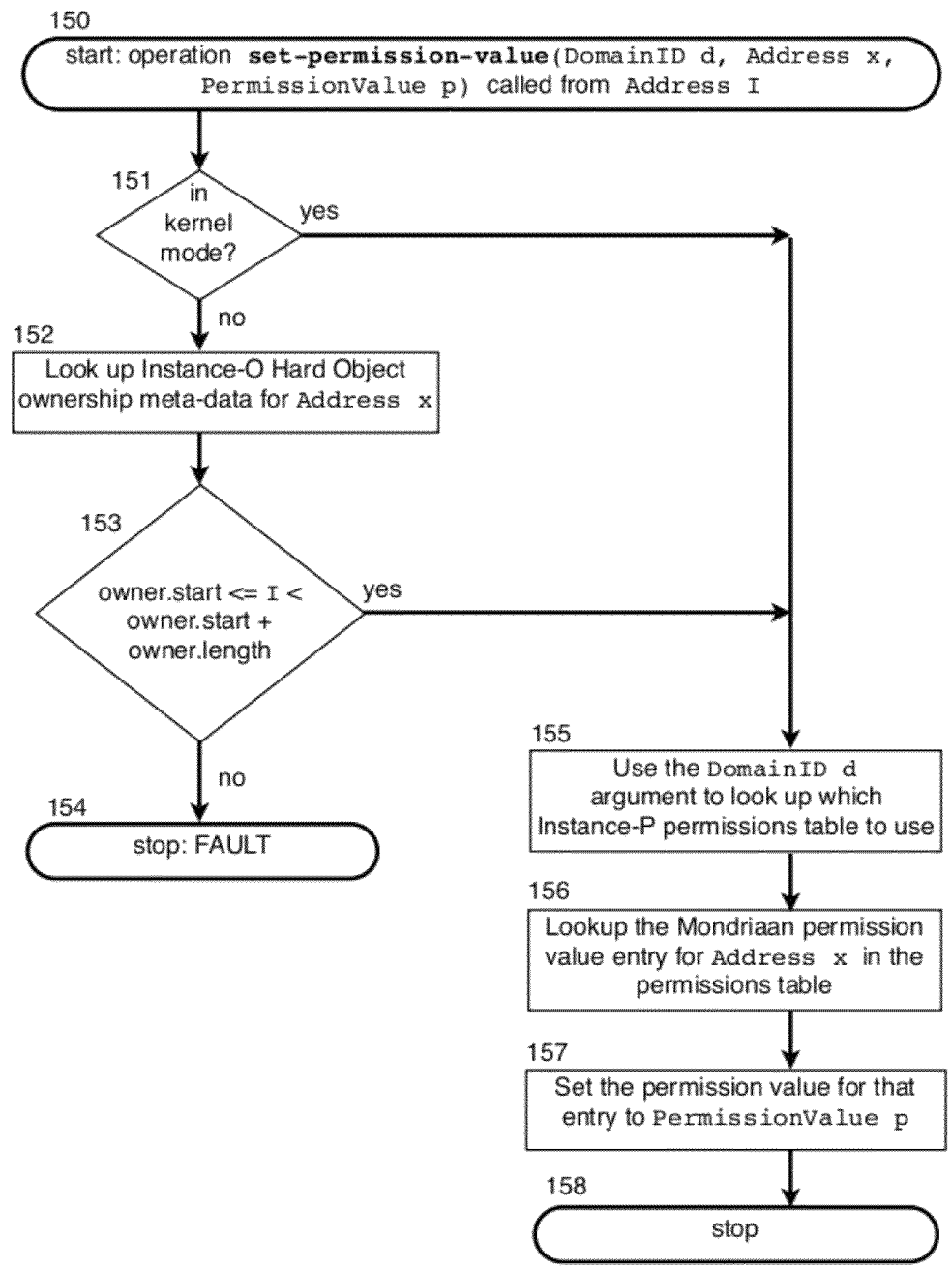
FIG. 15 shows a flowchart for the set-permission-value instruction which is part of the alternative embodiment Hybrid design with Mondriaan using Hard Object ownership and Mondriaan permissions.

When one of these instructions is encountered, it operates as follows; see FIG. 15.
  (1) 151 If the CPU is in kernel mode, allow the access: go to step (4).
  (2) 152 Otherwise, the Instance-O Hard Object meta-data associated with the target address is looked up.
  (3) 153 the address of the instruction is not in the owner range of the target address, then the CPU faults 154.
  (4) 155 The DomainID id argument is used to look up the permissions table to use (using the Instance-P of the Mondriaan design above).
  (5) 156 The Mondriaan permission value entry for this address is looked up in the permissions table.
  (6) 157 The instruction sets or gets permissions from the entry in this permissions table for the address in question.

Data Access Rules Use Instance-P Mondriaan Permission Values

Figure 16:
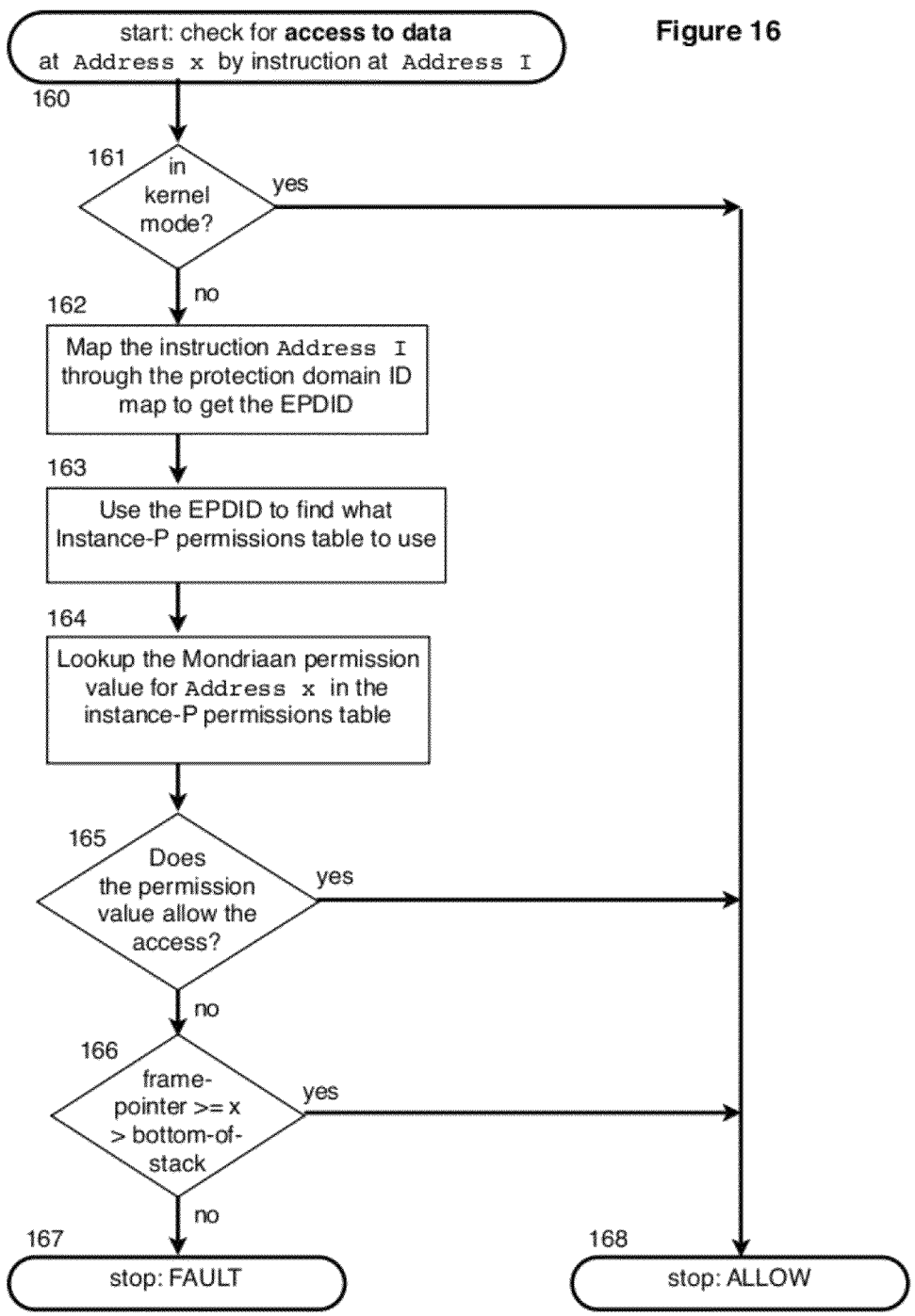
FIG. 16 shows a flowchart for a data access check for an attempted read or write to a target address in the context of the alternative embodiment Hybrid design with Mondriaan using Hard Object ownership and Mondriaan permissions.

When read or write access by an instruction to a target address is attempted, the following checking happens, see FIG. 16.
  (1) 161 If the CPU is in kernel mode, 168 allow the access.
  (2) 162 Otherwise, the instruction address is mapped through the protection domain ID map to determine the current effective protection domain ID (EPDID).
  (3) 163 The EPDID is used to look up which Instance-P permissions table to use.
  (4) 164 The target address is used to look up the Mondriaan permission value for this access.
  (5) 165 This permission value grants the access, 168 allow the access.
  (6) 166 Otherwise, if the target address is within the accessible stack range delimited by the frame-pointer register and the bottom-of-stack register, 168 allow the access.
  (7) 167 Otherwise, fault.

Note that steps (2) and (3) together can be thought of in a single step as a "protection domain map" from the instruction address to an (Instance-P) permissions table. Further, steps (2), (3), and (4) together can be thought of in a single step as a "permissions map" from an "instruction/data address pair" comprising (a) the instruction address and (b) the target address to a permission value.

Embodiments of the Protection Domain ID Map

Figure 14:
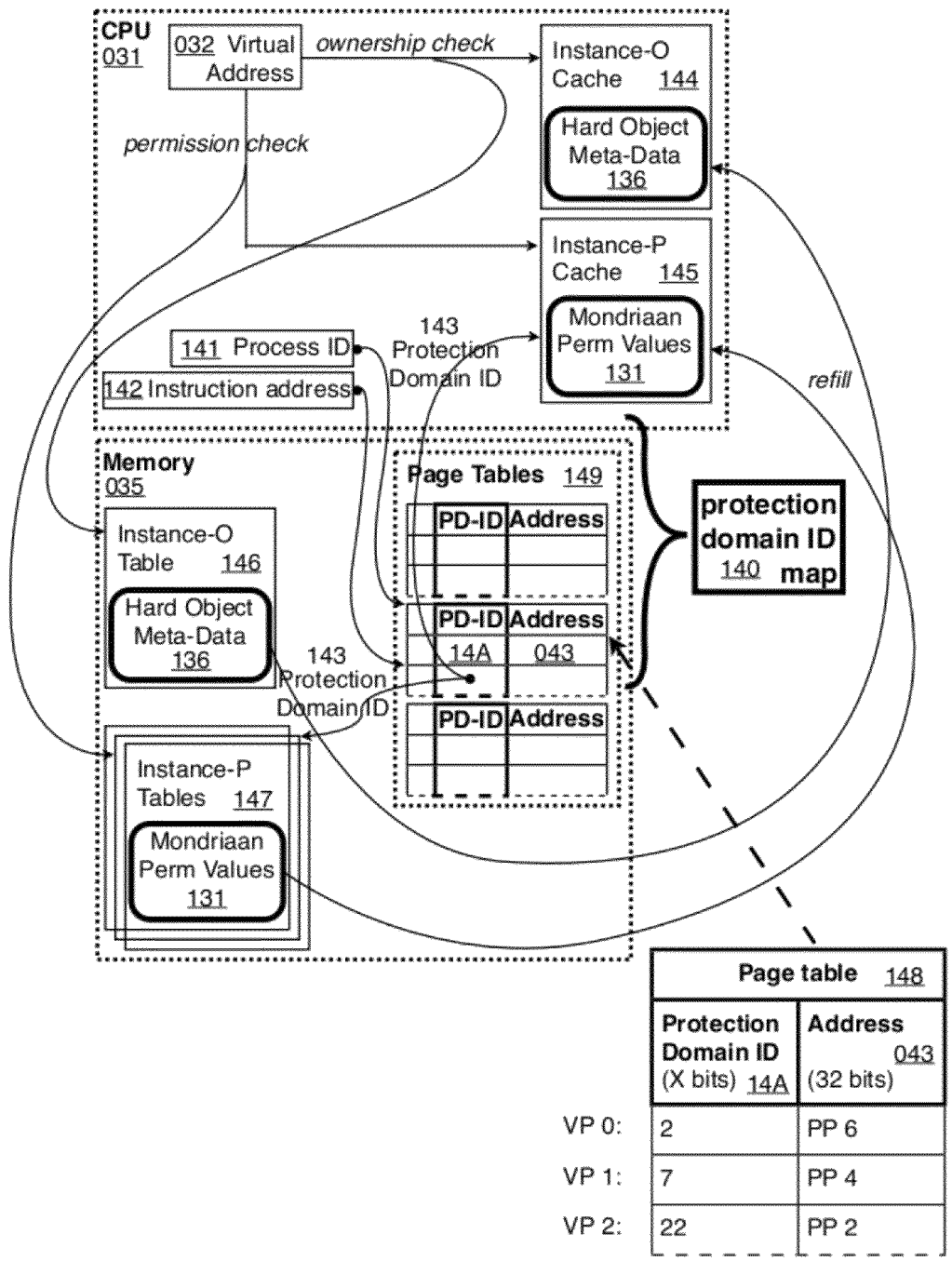
FIG. 14 shows the alternative embodiment Hybrid design with Mondriaan using Hard Object ownership and Mondriaan permissions, including Instance-O using Hard Object meta-data, Instance-P using Mondriaan permission values, and the protection domain ID map as embodied as a protection domain ID column added to the page table entry; note that the label for the protection domain ID map attempts to indicate the whole group of constituent parts into which it has been decomposed.

One embodiment for the protection domain ID map 140 extends the page table entries for pages with a "protection domain ID field" 14A. At the execution of an instruction the effective protection domain ID 143 is the value of this field for the page containing the instruction address. See FIG. 14.

Another embodiment for this map embeds the protection domain ID for the page into the first address of the text page.

Another embodiment for this map is for the protection domain ID to be embedded in a "protection domain ID header table" within the text page (say at the top). This table is a list of pairs of (1) addresses relative to the top of the page and (2) a protection domain IDs. This table is sorted by the relative addresses and is interpreted as partitioning the page into regions and associating a protection domain ID to each region. At the execution of an instruction the EPDID is the ID of the region containing the instruction address. This embodiment has the advantage that no additional entries are needed in the page table.

Extension Using Mondriaan Multi-Level Permissions Tables

Consider a situation where a module M1 wants to allow both modules M2 and M3 to have read-only access to the heap objects owned by M1. A natural organization of the software associates each module to a different protection domain ID using the protection domain ID map 140. Recall that each protection domain ID is associated with a different permissions table. Let x denote the memory address of a heap page owned by M1. To set the permission value that regulates an access by module M2 to an address x, module M1 must issue instruction 12C set-permission-value (M2, x, read-only). Then to set the permission value that regulates an access by module M3 to address x, module M1 must issue instruction set-permission-value(M3, x, read-only).

This situation has some undesirable properties. First, the same permission value for the addresses owned by M1 are duplicated in two different permission tables: that of M2 and M3. Second, if M1 wants to later change some of the permission values, M1 must re-issue two calls to set-permission-value to change those permission values as seen by both modules M2 and M3.

[WCA-2002, section 3.4] discloses a Multi-level Permissions Table (MLPT) mechanism which this extension uses to ameliorate this situation. The multi-level aspect of the MLPT means that the permissions table (PT) may map a whole range of addresses to a "permissions sub-table" (PST) where the PST then further maps addresses in that range to permission values; we say the permissions sub-table "attaches" to the permissions table. One advantage of this MLPT mechanism is that two different permissions tables may map a range of addresses to the same permissions sub-table.

To integrate MLPT, this embodiment adds these instructions, see FIG. 12e, 12E 12F 12G 12H:
DomainID make-sub-domain(Address start, Address length)
del-sub-domain(DomainID d)
attach-sub-domain(DomainID d, DomainID subDom)
detach-sub-domain(DomainID d, DomainID subDom).

The 12E make-sub-domain instruction (1) creates a new PST for the range of memory addresses delimited by start and length: all addresses x where start<=x<start+length, and (2) returns a new DomainID for the new PST. This instruction only operates if the caller is the kernel or the owner of the entire range of memory addresses delimited by start and length; otherwise the CPU faults.

Th 12F del-sub-domain instruction deletes the PST associated with the DomainID d. This instruction only operates (1) if the caller is the kernel or the owner of the entire range of memory addresses delimited by start and length of the PST and (2) no permissions table currently attaches the PST; otherwise the CPU faults.

Th 12G attach-sub-domain instruction attaches the PST associated with the DomainID subDom to the permissions table associated with the DomainID d. This instruction only operates if the caller is the kernel or the owner of the entire range of memory addresses delimited by start and length of the PST; otherwise the CPU faults.

The 12H detach-sub-domain instruction breaks the attachment of the permissions table associated with DomainID d and the PST associated with SubDomainID subDom. This instruction only operates if the caller is the kernel or the owner of the entire range of memory addresses delimited by start and length of the PST; otherwise the CPU faults. The permissions table now maps the range of addresses delimited by start and length of the PST to a default "no access permission" value.

We consider the previous example in light of these new instructions. Using 12E make-sub-domain, M1 makes a new PST with a range covering the memory addresses of the heap pages of M1. Using 12C set-permission-value, M1 then sets permission values mapped by this PST. Lastly, using 12G attach-sub-domain once each for the domains of M2 and M3, M1 attaches the new PST to each of the permissions tables of M2 and M3 respectively. Now memory accesses by modules M2 and M3 to the heap pages of M1 will be allowed only if the permission value set using the earlier invocation of 12C set-permission-value allows it.

Figure 17:
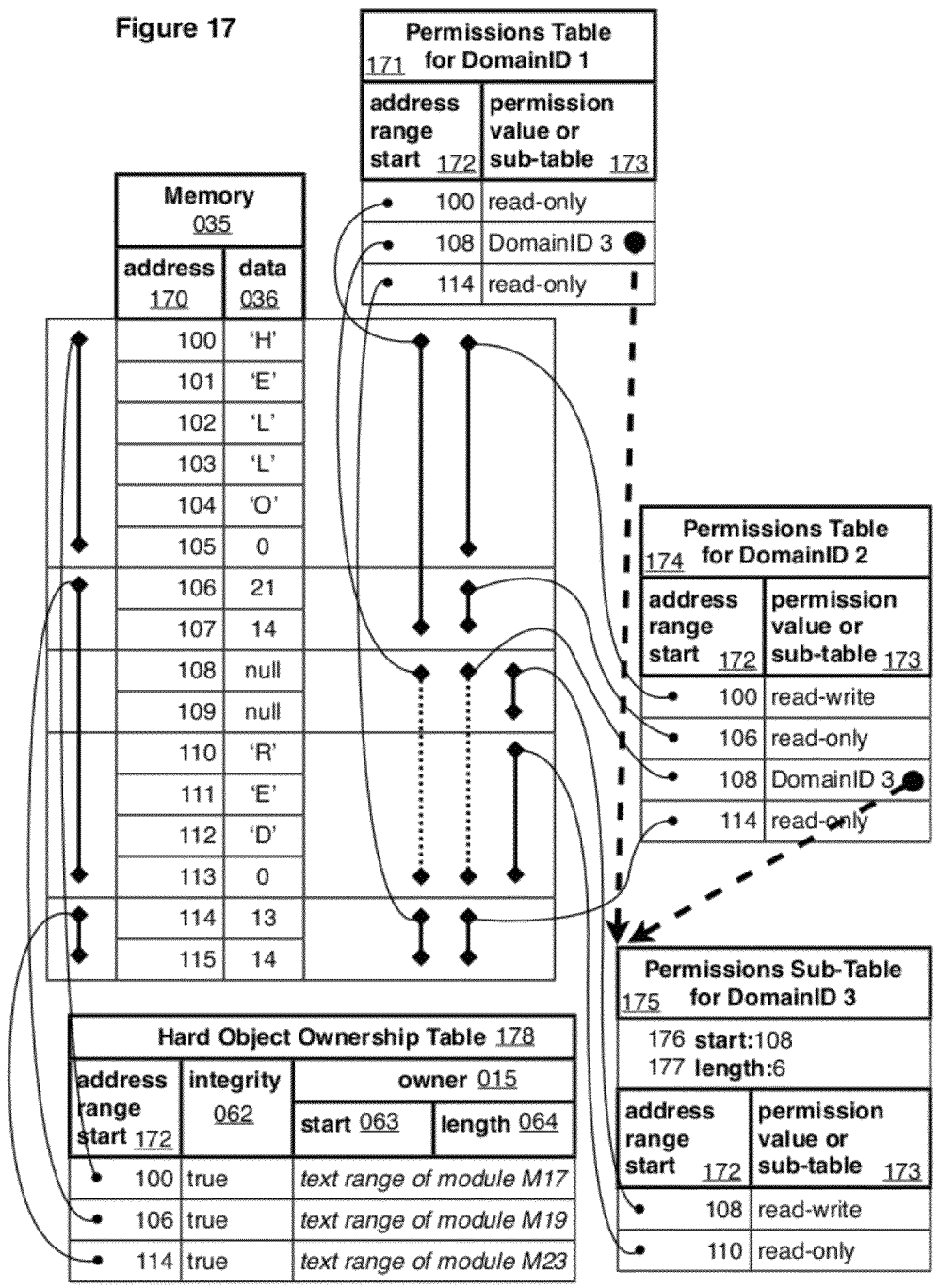
FIG. 17 shows an example of both permissions and ownership being independently annotated onto the same data addresses in the context of the Multi-level Permissions Tables extension to the alternative embodiment Hybrid design with Mondriaan using Hard Object ownership and Mondriaan permissions.

FIG. 17 shows an example of both permissions and ownership being independently annotated onto the same data addresses. The two permissions tables on the right 171 174 are associated with DomainID's 1 and 2 respectively. The PTs have a permissions sub-table 175 attached corresponding to DomainID 3. Note that the two PTs provide different access permissions to, say, memory address 100 (containing the letter 'H'): this address is read-only in DomainID 1 and read-write in DomainID 2. Further note that the PST DomainID 3 provides the permission values for addresses 108 through 113, overriding the permissions of tables for domains DomainID 1 and DomainID 2 (as indicated by the dashed vertical line), and that these permission values are shared across DomainID 1 and DomainID 2. Note further that the Hard Object ownership table 178 shows that modules M17, M19, and M23 own respective parts of the data addresses shown. These modules are therefore the particular owning text addresses containing the instructions that control the aforementioned permissions.

Extension Allowing Other Functions to Operate on Stack Allocated Objects

Functions frequently make temporary objects in their stack frame, called "stack allocated" objects. A common idiom is for function $f$ to make such an object on its stack frame and then call a function g passing a pointer to that object as an argument of the call to g so that g can operate on the object in a way useful to $f$ before returning control to $f$.

As part of the mechanism of a function call the frame pointer is set to point to the top of the stack frame of g. Doing so means the frame of the suspended function $f$ is no longer "in frame", that is, between the addresses pointed to by the frame pointer register and the bottom-of-stack register. Since the stack memory is owned by a special "nobody" owner, function g therefore cannot access the stack allocated object of $f$ and this useful idiom no longer works.

In this embodiment we add an extension to allow this idiom to work. We simply allow the set-permission-value instruction to set the permission value of a memory address x if address x is in frame, that is, greater than or equal to the addresses pointed to by the frame-pointer and less than that pointed to by the bottom-of-stack; we allow this even if x has a different owner than the caller of the set-permission-value instruction. Now function f can allocate an object on its stack, set the permissions as they would be if the object were allocated on the heap and owned by the module of function f, and then pass a pointer to function g for further processing of the object.

This mechanism leaves open the possibility of module boundary violations if it is used to open up access to addresses on the stack by one function which are then unexpectedly left that way upon transfer of control to another function by either a call or return. Such boundary violations can be prevented by function authors following various protocols where functions check/reset the permissions of the stack frame before/after function calls or returns. Additionally or alternatively a software static analysis could verify that certain invariants on the use of the set-permission-value instruction are followed by the program functions. These are matters of software usage of the hardware primitives provided herein and are thus beyond the scope of this document.

Generalizing to Kernel Protection

Much of the functionality traditionally provided within a monolithic kernel is only there to protect the kernel from the user program, not because the kernel needs special access to the hardware. Further, anecdotal evidence suggests that protecting parts of the kernel from other parts of the kernel could greatly improve kernel reliability. For example, drivers make up much of the kernel by size, however they are not nearly as well-examined as the kernel core and can easily crash or corrupt the entire system when they contain an error. If they were kept separate from the kernel core, a much more robust system would result.

An extension of Hard Object implements such a system as follows. A region of instruction pages is distinguished as a special "privilege-master region" (PMR) 182. Recall that in the first embodiment instructions located within the kernel are granted the special ability to execute any instruction, regardless of ownership. In this embodiment, this special ability is granted only to instructions located within the PMR 182. One embodiment of the PMR to have a region of instructions delimited by two novel hardware registers we call "privilege-master-start" 113 and "privilege-master-end" 114; see FIG. 11c.

All Layers of the Memory Hierarchy Must be Controlled Exclusively by the PMR

However, this change is not sufficient to keep the memory of one kernel module safe from others, as memory pages can be swapped out to the main system disk when the demand for virtual memory exceeds the available physical memory. Therefore additionally the "system swap store" 185 would need to be distinguished in hardware as accessible only through a special system swap input/output channel 180 that can only be accessed by code in the PMR 182; see FIG. 18. In general, the privilege-master would manage the system swap store 185, swapping, and the translation lookaside buffer (TLB), and contain any other system software relating to the memory system and the Hard Object permissions.

Enabling an Exokernel

With this design generalization the rest of the kernel can now be protected from user processes (and from other parts of the kernel) in the form of user-mode Hard Object modules. The special kernel hardware mode can now be dispensed with entirely for the rest of the traditional kernel and the kernel software can be completely de-constructed into libraries. Such a de-construction of the kernel is reminiscent of the "exokernel" design in [EKO-1995] in that it allows user processes fine-grain knowledge of kernel structures; however it goes further in providing protection for those structures without expensive kernel crossings. Note that there is potentially a significant performance speedup due to the removal of such kernel crossings.

Privilege-Master Region Addresses and Memory-Mapped I/O Addresses Must be the Same Across all Virtual Memory Spaces The PMR 182 must be stable across all the virtual memory spaces. Further, in an exokernel design, the same restriction applies to any memory mapped I/O addresses that are protected as a Hard Object user-mode module.

One way to accomplish this is to have the virtual memory system map the PMR and memory-mapped I/O into a fixed range of virtual addresses whenever it creates a new address space (page table); this design is exhibited by a number of current operating systems that utilize a reserved range of virtual addresses for the kernel and is compatible with an exokernel design. Another way is to use a Single Address Space Operation System; see below.

If an exokernel design is not desired (and the traditional CPU kernel mode retained) then the problem is also solved as all parts of the kernel share the same virtual address space. While user/kernel mode protects the kernel from user processes as is usual, there is still benefit as different parts of the kernel are now protected against each other.

Dramatically Different Arrangements of Virtual Memory

No Virtual Memory

Although described in terms of virtual memory, a Hard Object design can be implemented for a machine without virtual memory as long as there is some hardware mechanism for associating Hard Object meta-data with memory addresses as the page table entries do in a virtual memory system. That is, some sort of permissions management unit would be required, but not a complete Memory Management Unit.

Single Address Space Operating System

An alternative embodiment of Hard Object implements a Single Address Space Operating System using Hard Object protection, following [MUNGI] for the rest of the design:

The single address space incorporates all memory objects on all nodes in a distributed system. There are no user-visible memory hierarchies, no file system. Any memory object is potentially persistent, i.e. can outlive its creator process. All objects are uniquely identified by their virtual address, which is a 64-bit number. Any object is potentially accessible by any process, provided the process is authorized to do so.

This embodiment requires use of the kernel protection extension using the privilege-master region given above.

GLOSSARY OF TERMS IN THE CLAIMS access: The movement of data between a CPU register and a RAM cell at an address—a read or a write.
access condition: The conditions under which an access to data at a data address is allowed.
accessible stack range: The range of data addresses on the stack that can be accessed; delimited by the frame-pointer register and the bottom-of-stack register.
accessing instruction: An instruction performing an access to data at a data address.
accessing instruction address: The address of an accessing instruction.
annotation: An association.
argument: A datum passed to an operation which parameterizes the behavior of the operation.

association: A abstraction indicating a persistent relationship between two things, x and y, where having one thing, x, one may find the other, y. Thing y is said to be "associated with"×"by the association". The terms "relation" and "relationship" are meant to at least encompass, without being limited to, the meaning of the term "relation" as used in the field of Relational Algebra.

bottom-of-stack register: A CPU register that points to the maximum allowable extent of the stack. In a usual prior art memory organization it should not change while a particular thread context is executing; however it should be changed by the thread scheduler as a CPU switches from executing one thread to executing another.

computer: A self-contained device for computing, usually presenting a well-defined interface.

condition: A mathematical predicate. Equivalently, a declarative sentence that is either true or false; such a sentence is usually about certain given objects and is then called a "condition on" those objects.

data: Bits in a computer not intended to be interpreted directly as instructions by the CPU.

data access: An access to data at a data address.

data address: Many prior art computer systems partition RAM addresses into "data", those for storing data, and "text", those for storing program instructions; a data address is one address of the first part, that is, the addresses for storing data.

data address set-integrity argument: The argument to the set-integrity operation that is a data address; the operation associates this argument with a new integrity bit.

data address set-owner argument: The argument to the set-owner operation that is a data address; the operation associates this argument with a new owner.

data address set-permission-value argument: The data address argument to the set-permission-value operation; the operation associates this argument, together with a subset of instruction addresses argument, with a new permission value argument.

data address set-public-readable argument: The argument to the set-public-readable operation that is a data address; the operation associates this argument with a new public-readable bit.

data module-ID: A module-ID annotated onto a datum or a plurality of data. For example, an identifier associated in the module meta-data table with a data address, allowing the data address to be associated with other meta-data, such as an owner, indirectly through use of the identifier.

data page: Prior art computer systems organize RAM addresses into pages; a page containing data addresses is a data page. Note that prior art computer systems tend to mark entire pages as completely data or completely text (instruction) pages.

datum: singular of data; see entry for data.

domain: an abbreviation for "protection domain"; see the entry for protection domain.

domain set-permission-value argument: The argument to the set-permission-value operation that is a subset of instruction addresses; the operation associates all pairs consisting of elements of this subset and the target data address argument to the new permission value argument.

driver instruction address: The instruction address of a driver program for controlling an input/output operation to an input/output channel.

element: (Mathematics) A member of a set.

fault: A condition which the CPU of a microprocessor can enter when something has gone wrong. Usually upon the occurrence of a fault the CPU aborts its execution of the current program and begins executing an fault handling routine.

frame-pointer register: The CPU register pointing to the top of the current stack frame.

input/output channel: An abstract way of referring to a connection between the core of the computer and an external device such that information can be sent between the two.

input/output operation: An abstract way of referring to a well-defined transfer of information across an input/output channel.

instruction: Bits in a computer meant to be interpreted by the CPU as directions for it to perform one of a predetermined list of manipulations of data, such amount of data usually fixed and such manipulations usually implemented completely in microprocessor hardware.

instruction address: Many prior art computer systems partition RAM addresses into "data", those for storing data, and "text", those for storing program instructions; an instruction address is one address of the second part, that is, the addresses for storing instructions.

instruction module-ID: A module-ID annotated onto an instruction or a plurality of instructions. For example, an identifier associated with an instruction address in a module-ID table.

instruction/data address pair: A pair comprising an instruction address and a data address. Such a pair is the input from which a permissions map determines a permission value. This permission value is used to determine if the instruction at the instruction address may access the data at the data address in the way that it is attempting the access.

integrity-bit: A bit of meta-data associated with a data address. This bit is cleared to false whenever the owner of this data address is changed, and can only be set to true again by the new owner. This bit allows a module to recognize a Trojan Horse attack by another module.

kernel-mode: The mode of a CPU where all instructions are allowed; usually as distinguished from user-mode.

map: As a noun, the embodiment of any abstract association. As a verb, the abstract act of associating. This term is meant to indicate any method for associating elements with one another. Use of this term—and others like it that evoke the context of an association or relationship between elements—is not meant to limit to any particular embodiment.

meta-data: data about data. For example, meta-data of data often indicates how said data may be used, including but not limited to encoding access permissions to said data.

meta-datum: singular of meta-data; see entry for meta-data.

microprocessor: The core of a modern computer system.

module: A subset of instruction addresses all collectively owning and maintaining data as one.

module-ID: an identifier for a module.

module-ID table: A table associating a module-ID with a data address. This mechanism allows a data address to be more easily annotated as the module-ID may be annotated instead; this is particularly useful if many data addresses all share the same annotation.

module meta-data table: A table associating a module's subset of instruction address with a module-ID. This mechanism allows the module's subset of instruction addresses all associated with the same module-ID to more easily be treated as a single entity.

new integrity set-integrity argument: The integrity bit argument to the set-integrity operation. This is the integrity bit with which the instruction/address pairs comprising (a) the instruction addresses in the subset of instruction addresses argument and (b) the data address argument will be associated after the set-integrity operation.

new owner set-owner argument: The owner argument to the set-owner operation. This is the owner with which the data address argument will be associated after the set-owner operation.

new permission value set-permission-value argument: The permission value argument to the set-permission-value operation; the operation associates all pairs consisting of elements of the subset of instruction addresses argument and the target data address argument to this new permission value argument.

new public-readable set-public-readable argument: The public-readable bit argument to the set-public-readable operation. This is the public-readable bit with which the data address argument will be associated after the set-public-readable operation.

operation: An action comprising the execution of one or more instructions.

owner: Said of a data address: the subset of instruction addresses that (a) controls access to the data address and (b) can give ownership away to another subset of instruction addresses. The exact details of controlling access depend on which embodiment of the Hard Object design is chosen: in one embodiment, data access is restricted to the owner, whereas in others control of the permissions which govern access to the data is restricted to the owner.

page table entry: A prior art mechanism for annotating memory pages with meta-data. Also can mean the meta-data so annotated.

page table entry owner: The owner of all of the data addresses on a data page. It is associated with those data addresses in an efficient manner by being annotated on the page as a field of the page table entry.

permission value: A value encoding what kind of accesses are allowed to data at a given data address.

permissions map: A map taking as input an instruction/data address pair, comprising an instruction address and a data address, and associating them with a permission value. Used to determine if an instruction at an instruction address may access data at a data address.

permissions map data address: The data address part of the instruction/data address pair in the context of a permissions map.

permissions map instruction address: The instruction address part of the instruction/data address pair in the context of a permissions map.

permissions sub-table: A table that implements part of a permissions map, defining permission values for the particular subset of data addresses called its permissions sub-table range. One permissions sub-table can be associated with many permissions tables; when it is its permissions sub-table map overrides those permissions tables for data addresses in its permissions sub-table range.

permissions sub-table map: In the context of a permissions sub-table, a map associating a data addresses with a permission value.

permissions sub-table permission value: A permission value in the context of being stored in a permissions sub-table.

permissions sub-table range: In the context of a permissions sub-table, the data addresses for which the permissions sub-table map associates permission values.

permissions table: A table associating a data address with a permission value. The permission value is used at the time of an access to data at the data address to determine if the access should be allowed.

privilege-master region: A subset of instruction addresses the instructions of which are not subject to the usual restrictions on accesses to data at data addresses and on operations to manipulate the ownership and permissions meta-data associated with data addresses and instruction addresses. Also only these instructions can perform input/output operations on the input/output channel connected to the system swap store.

program: A collection of instructions executed by a computer/microprocessor.

protection domain: abstractly, a set of resources that may be accessed in a particular context; one says that any metaphor of an agent is 'in the protection domain' when it has such access to said resources.

protection domain map: A map associating an instruction address to a permissions table. When an instruction at an instruction address accesses data this map is used to find the permissions table to use to determine the permission value that decides if the access is allowed.

protection domain map instruction address: An instruction address in the context of being part of a protection domain map.

protection domain map permissions table: A permissions table in the context of being part of a protection domain map.

public-readable-bit: A bit of meta-data associated with a data address. Can only be set by the owner of the data address. If this bit is true then any instruction can read, but not necessarily write, the data at the data address—unless the untrusted region embodiment is used and the instruction address of the instruction is in the untrusted region, overriding the pubic-readable-bit.

read: An access to data at a data address that transfers data from the RAM cell indexed by the data address to a CPU register.

relation: Terms "relation" and "relationship" are meant to at least encompass, without being limited to, the meaning of the term "relation" as used in the field of Relational Algebra.

selected permissions sub-table: A permissions sub-table having a permissions sub-table range of data addresses that contains the target data address in question.

set: (Mathematics) Usually considered a undefined primitive concept in mathematics; perhaps describable as a containment metaphor where any given thing must be either in the set or not, never neither nor both; the things contained are called elements.

set-integrity operation: An operation that sets the integrity bit associated with a data address.

set-integrity condition: A condition that if met in a situation allows the set-integrity operation to proceed in that situation.

set-owner operation: An operation that sets the owner associated with a data address.

set-owner condition: A condition that if met in a situation allows the set-owner operation to proceed in that situation.

set-permission-value operation: An operation that sets the permission value associated with a data address and a set of instruction addresses.

set-permission-value condition: A condition that if met in a situation allows the set-permission-value operation to proceed in that situation.

set-public-readable operation: An operation that sets the public-readable bit associated with a data address.

set-public-readable condition: A condition that if met in a situation allows the set-readable-bit operation to proceed in that situation.

subset: (Mathematics) In the context of another set, a set where all of its elements are also elements of the other set.
subset of data addresses: A subset of all of the data addresses.
subset of instruction addresses: A subset of all of the instruction addresses.
system swap input/output channel: An input/output channel connected to the system swap store.
system swap store: A storage device where the virtual memory system keeps copies of the contents of virtual memory pages that are not in physical memory.
table: The embodiment of any abstract association. This term is meant to indicate any method for associating elements with one another. Use of this term is meant to suggest an embodiment and is not meant to limit to any particular embodiment.
target data address: The data address in the context of an instruction making an access to target data at a data address.
user-mode: The typical mode for the execution of programs on a computer where many dangerous instructions are not allowed; usually as distinguished from kernel-mode.
write: An access to data at a data address that transfers data to the RAM cell indexed by the data address from a CPU register.

CONCLUSION

Engineers who build machines made of atoms (rather than of software) rely on locality of causality to make machines mostly safe in the presence of failure or attacks: cars have a firewall between the engine and the driver; houses have walls and a lockable door between the inside and the outside. However, computer hardware engineers have worked very hard to eliminate all locality of causality within a computer: that is, on a modern computer, within any given process, any instruction can access any data in the entire address space of the process. Hardware engineers did this because giving the software engineers freedom to use any instruction to access any data makes it very easy to write programs that do what you really want; however having this much freedom also makes it very easy to write programs that do what you really do not want. Although software engineers separate programs into modules (code that exclusively maintains the invariants of its data), they lack appropriate fine-grain hardware primitives with which to efficiently implement enforcement of this separation. This state of affairs contributes to the problem that "machines made of software" (programs) tend to be much less reliable than machines made of atoms.

The present Hard Object work provides simple fine-grain hardware primitives with which software engineers can efficiently implement enforceable separation of programs into modules, thereby providing fine-grain locality of causality to the world of software. Further, this is achieved using a hardware mechanism that seems to be significantly simpler than those in the prior art. Together with software changes, Hard Object enforces Object Oriented encapsulation semantics in hardware; that is, we make software objects hard.

Although the description above contains many specificities, these should not be construed as limiting the scope of the embodiment but as merely providing illustrations of some of the presently envisioned embodiments as there are many ways of associating an integrity bit and owner text to memory addresses in such a way as the basic Hard Object rules may be checked efficiently. Thus the scope of the embodiment should be determined by the appended claims and their legal equivalents, rather than by the examples given.

We claim:

1. A method of regulating an execution of a program by a microprocessor, said microprocessor having a memory comprising a plurality of locations addressed by a plurality of instruction addresses, each instruction address having an instruction, and said microprocessor having a plurality of data addresses, each data address having a datum and each data address being associated with an owner subset of instruction addresses, said method comprising:
when an accessing instruction at an accessing instruction address attempts to access a datum at a data address, allowing the access or issuing a fault based on an evaluation of at least one access condition comprising:
(a) allowing the access if said accessing instruction address is an element of the owner subset of instruction addresses associated with the data address being accessed by said accessing instruction,
when a set-owner operation taking a plurality of set-owner arguments, said set-owner arguments comprising a data address and a new owner subset of instruction addresses, attempts to alter an owner subset of instruction addresses associated with at least one data address to a new owner subset of instruction addresses, allowing said set-owner operation by altering the owner subset of instruction addresses associated with the at least one data address to be the new owner subset of instruction addresses, or issuing a fault, based on an evaluation of at least one set-owner condition comprising:
(a) at least one instruction address of at least one instruction of said set-owner operation being an element of the owner subset of instruction addresses associated with said data address of said set-owner arguments.

2. The method of claim 1, said microprocessor further having a kernel-mode,
wherein said access condition further comprises
(b) allowing the access if said microprocessor is in kernel mode.

3. The method of claim 1, said microprocessor further having a kernel-mode,
wherein said set-owner condition further comprises
(b) said microprocessor being in kernel mode.

4. The method of claim 1, said microprocessor further associating an integrity-bit with each of said data addresses, said method further comprising:
when said set-owner operation executes, further clearing to false said integrity-bit associated with said data address of said set-owner arguments,
when a set-integrity operation attempts to alter the integrity-bit associated with at least one data address of a plurality of set-integrity arguments to a new integrity-bit of the set-integrity arguments, allowing said set-integrity operation or issuing a fault based on an evaluation of at least one set-integrity condition comprising:
(a) at least one instruction address of at least one instruction of said set-integrity operation being an element of the owner subset of instruction addresses associated with the data address of said set-integrity arguments.

5. The method of claim 4, said microprocessor further having a kernel-mode,
wherein said set-integrity condition further comprises
(b) said microprocessor being in kernel mode.

6. The method of claim 1, said microprocessor further having a frame-pointer register and a bottom-of-stack register delimiting an accessible stack range,
wherein said access condition further comprises:
(b) allowing the access if said data address is within said accessible stack range.

7. The method of claim 1, said microprocessor further comprising a public-readable-bit associated with each of said data addresses,
  wherein said access condition further comprises:
    (c) allowing the access if said public-readable-bit associated with at least one data address is true and the access is a read,
  said method further comprising:
  when a set-public-readable operation attempts to alter the public-readable-bit associated with at least one data address to a new public-readable-bit, allowing said set-public-readable operation or issuing a fault based on an evaluation of at least one set-public readable condition comprising:
    (a) at least one instruction address of at least one instruction of said set-public-readable operation being an element of the owner subset of instruction addresses associated with said data address.

8. The method of claim 1, said microprocessor further comprising:
  a data page associated with at least one data address,
  a page table entry associated with said data page,
  a page table entry owner associated with said page table entry,
  wherein the owner subset of instruction addresses associated with said at least one data address is specified as the page table entry owner associated with the page table entry associated with the data page associated with said at least one data address.

9. The method of claim 1, said microprocessor further comprising:
  a module-ID table associating a data module-ID with at least one data address,
  a module meta-data table associating a module's subset of instruction addresses with an instruction module-ID,
  wherein the association of an owner subset of instruction addresses with said at least one data address comprises:
  specifying said owner subset of instruction addresses associated with said at least one data address as the module's subset of instruction addresses associated by said module meta-data table with said instruction module-ID,
  where said instruction module-ID is equal to said data module-ID associated by said module-ID table with said at least one data address.

10. The method of claim 1, said microprocessor further having a privilege-master region subset of instruction addresses,
  wherein said access condition further comprises
    (b) allowing the access if said accessing instruction is an element of said privilege-master region subset of instruction addresses.

11. The method of claim 1, said microprocessor further having a privilege-master region subset of instruction addresses,
  wherein said set-owner condition further comprises
    (b) at least one instruction address of at least one instruction of said set-owner operation being an element of said privilege-master region subset of instruction addresses.

12. The method of claim 10, said microprocessor further having a system swap store,
  having a plurality of input/output channels for a plurality of input/output operations, said input/output operations controlled by a plurality of drivers, said drivers comprising a plurality of driver instruction addresses,
  having a system swap input/output channel connected to said system swap store, where said system swap input/output channel is the only input/output channel connected to said system swap store,
  said method further comprising:
  allowing an input/output operation on said system swap input/output channel only when at least one driver instruction address of the driver controlling said input/output operation is an element of said privilege-master region subset of instruction addresses.

13. A method of regulating an execution of a program by a microprocessor, the microprocessor having a memory comprising a plurality of instruction addresses, each instruction address having an instruction, and the microprocessor having a plurality of data addresses, each data address having a datum, the microprocessor having a plurality of permissions tables, each permissions table associating a data address with a permission value, the microprocessor having a protection domain map associating each instruction address with one of said plurality of permissions tables, and the microprocessor having a plurality of permissions sub-tables, each permissions sub-table comprising:
  (a) a permissions sub-table range of data addresses, and
  (b) a permissions sub-table map associating each data address that is an element of said permissions sub-table range of data addresses with a permissions sub-table permission value,
  some of said permissions sub-tables being associated with some of said permissions tables, said method comprising:
  when an accessing instruction at an accessing instruction address attempts to access a datum at at least one data address, allowing the access or issuing a fault based on an evaluation comprising the steps of:
  (a) finding the permissions table associated by said protection domain map with said accessing instruction address;
  (b) finding a permission value by:
  (i) if said data address is an element of the permissions sub-table range of a selected permissions sub-table associated with the permissions table found in step (a), then finding the permissions sub-table permission value associated by the permissions sub-table map of said selected permissions sub-table with said data address, or
  (ii) if said data address is not an element of the permissions sub-table range of a selected permissions sub-table associated with the permissions table found in step (a), then finding the permission value associated by said permissions table with said data address; and
  (c) allowing the access or issuing a fault based on the permission value found in step (b).

14. The method of claim 13, said microprocessor further having a kernel-mode,
  wherein the method further comprises the step, after step (c) of allowing the access if said microprocessor is in kernel mode.

15. The method of claim 13, said microprocessor further associating an owner subset of instruction addresses with each of said data addresses,
  said method further comprising:
  when a set-owner operation attempts to alter an owner subset of instruction addresses associated with at least one data address to a new owner subset of instruction addresses, allowing said set-owner operation by altering said owner subset of instruction addresses associated with said at least one data address to be the new owner subset of instruction addresses, or issuing a fault, based on an evaluation of at least one set-owner condition comprising:

(a) at least one instruction address of at least one instruction of said set-owner operation being an element of the owner subset of instruction addresses associated with said at least one data address for which said set-owner operation is attempting to alter said owner subset of instruction addresses, when a set-permission-value operation taking a plurality of set-permission-value arguments, said set-permission-value arguments comprising a domain subset of instruction addresses, a data address, and a new permission value, attempts to associate a new permission to a set-permission-value datum in one of said permissions tables, allowing said set-permission-value operation or issuing a fault based on an evaluation of at least one set-permission-value condition comprising:

(a) at least one instruction address of at least one instruction of said set-permission-value operation being an element of the owner subset of instruction addresses associated with said set-permission-value argument.

16. The method of claim 15, said microprocessor further having a kernel-mode, wherein said at least one set-owner further comprises (b) said microprocessor being in kernel mode.

17. The method of claim 15, said microprocessor further comprising an integrity-bit associated with each of said data addresses, said method further comprising:

when said set-owner operation executes, further clearing to false said integrity-bit associated with said data address being altered by said set-owner operation, when a set-integrity operation taking a plurality of set-integrity arguments, comprising a data address and a new integrity-bit, attempts to alter the integrity-bit associated with at least one data address of a plurality of set-integrity arguments to a new integrity-bit of the set-integrity arguments, allowing said set-integrity operation or issuing a fault based on an evaluation of at least one set-integrity condition comprising:

(a) at least one instruction address of at least one instruction of said set-integrity operation being an element of the owner subset of instruction addresses associated with said at least one data address of said set-integrity arguments.

18. The method of claim 17, said microprocessor further having a kernel-mode, wherein said set-integrity condition further comprises (b) said microprocessor being in kernel mode.

* * * * *